(12) United States Patent
Nasu

(10) Patent No.: US 7,555,657 B2
(45) Date of Patent: Jun. 30, 2009

(54) COMMUNICATION DEVICE, SOFTWARE UPDATE DEVICE, SOFTWARE UPDATE SYSTEM, SOFTWARE UPDATE METHOD, AND PROGRAM

(75) Inventor: Masami Nasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 782 days.

(21) Appl. No.: 10/810,696

(22) Filed: Mar. 29, 2004

(65) Prior Publication Data

US 2004/0243994 A1   Dec. 2, 2004

(30) Foreign Application Priority Data

| Mar. 28, 2003 | (JP) | ................... 2003-090827 |
| Mar. 28, 2003 | (JP) | ................... 2003-090886 |
| Mar. 2, 2004 | (JP) | ................... 2004-058270 |
| Mar. 2, 2004 | (JP) | ................... 2004-058271 |

(51) Int. Cl.
| G06F 11/30 | (2006.01) |
| G06F 12/14 | (2006.01) |
| H04L 9/32 | (2006.01) |
| B41K 3/38 | (2006.01) |
| G06F 9/44 | (2006.01) |
| G06F 9/445 | (2006.01) |

(52) U.S. Cl. .................. 713/191; 380/59; 717/168; 717/169; 717/170; 717/171; 717/172; 717/173

(58) Field of Classification Search ................ 713/191; 717/168–178; 380/59
See application file for complete search history.

(56) References Cited

U.S. PATENT DOCUMENTS 5,878,256 A * 3/1999 Bealkowski et al. ........... 713/2
6,012,100 A * 1/2000 Frailong et al. ............. 709/250
6,073,172 A * 6/2000 Frailong et al. ............. 709/222
6,230,194 B1 * 5/2001 Frailong et al. ............. 709/220
6,332,139 B1   12/2001 Kaneko et al.
6,338,138 B1 * 1/2002 Raduchel et al. ............. 713/155
6,496,858 B1 * 12/2002 Frailong et al. ............. 709/221
6,880,086 B2 * 4/2005 Kidder et al. ............... 713/191
7,069,452 B1 * 6/2006 Hind et al. ...................... 713/1
2002/0046189 A1   4/2002 Morita et al.

FOREIGN PATENT DOCUMENTS

| JP | 8-190474 | 7/1996 |
| JP | 10-145354 | 5/1998 |
| JP | 2001-75965 | 3/2001 |
| JP | 2002-41295 | 2/2002 |
| JP | 2002-123779 | 4/2002 |
| JP | 2002-288066 | 10/2002 |

* cited by examiner

Primary Examiner—Nasser G Moazzami
Assistant Examiner—Oscar A Louie
(74) Attorney, Agent, or Firm—Oblon, Spivak, McClelland, Maier & Neustadt, P.C.

(57) ABSTRACT

A software update device capable of communicating with a target update device via a network, the software update device including: a certification information setting unit for generating a first certification information, and transmitting the first certification information to the target update device via a first communication path; a certification requesting unit for transmitting a second certification information to the target update device, and requesting the target update device to execute a certification process with the first and second certification information; and a transmitting unit for transmitting an update software for updating a software of the target update device to the target update device via a second communication path when the certification process succeeds, the second communication path having a process load less than that of the first communication path.

50 Claims, 27 Drawing Sheets

FIG.12

| No. | USED/UNUSED | PASSWORD |
|---|---|---|
| A | USED | adfghjuhgk |
| B | USED | hj75fgukja |
| C | UNUSED | 5rhjdebha |
| ⋮ | ⋮ | ⋮ |
| X | UNUSED | rtgfc6qkqa |
| Y | UNUSED | 6q3fgdysa |

COMMUNICATION DEVICE, SOFTWARE UPDATE DEVICE, SOFTWARE UPDATE SYSTEM, SOFTWARE UPDATE METHOD, AND PROGRAM

BACKGROUND OF THE INVENTION

1. Field of the Invention

The present invention relates to a communication device capable of communicating with a software update device via a network, a software update device capable of communicating with a target update device, a software update system including a communication device and a software update device, a software update system including a software update device and a target update device, a software update method, a program to be installed or executed by a computer for controlling a communication device capable of communicating with a software update device via a network, and a program to be installed or executed by a computer for controlling a software update device capable of communicating with a target update device via a network. As for the software to be updated, there are, for example, firmware and application programs.

2. Description of the Related Art

Conventionally, a communication device such as an image processing device having a communication function (e.g. a printer, a facsimile, a scanner, a digital complex apparatus) is subjected to updating of software, for example, firmware used for performing basic control of hardware. In an image forming apparatus management system shown in Japanese Laid-Open Patent Application No. 2002-288066, a service center obtains firmware version information from an image forming apparatus, and transmits firmware to the image forming apparatus via a communication control device when it is determined that the firmware of the image forming apparatus is old and requires updating, thereby performing updating of firmware.

In the image forming apparatus management system shown in Japanese Laid-Open Patent Application No. 2002-28066, communication between the service center and the communication control device is performed by using a public line (PSTN, Public Switched Telephone Network) or a leased line, and communication between the communication control device and the image forming apparatus is performed by using an RS-485 standard communication path.

However, in recent years where importance is placed on versatility and expandability, a management system, in which communication between a management device and a target management device is performed via a network such as the Internet or LAN (Local Area Network), has been proposed. Similar to the management system shown in Japanese Laid-Open Patent Application No. 2002-28066, the proposed management system may perform updating of firmware, for example, by transmittal of firmware from the management device to the target management device.

An exemplary process of updating firmware is shown in FIG. 26. Here, the management device is a firmware update device, and the target management device is a communication device and/or a target update device (target firmware update device).

In the process shown in FIG. 26, the firmware update device 91 and the target update device 92 communicate by using FTP (File Transfer Protocol), wherein an ID and a password for FTP are set to the firmware update device 91 beforehand, and are stored in the firmware update device 91 and the target update device 92.

In this process, the firmware update device 91 performs a version information obtainment process, for example, whenever a prescribed period has elapsed, or when a prescribed event occurs. In this process, first, the firmware update device 91 requests FTP connection by transmitting the ID and password to the target update device 92. The ID and the password are in compliance with the FTP standard. The target update device 92, having been requested for connection, is able to verify the firmware update device 91 from the ID and the password. The target update device 92 compares the ID and the password with those stored therein, and establishes a connection when there is a match of ID and password resulting to successful verification (Step S11). When there is no match, no connection is established, and the process, due to error, is terminated.

After connection is established, the firmware update device 91 requests transmittal of firmware version information to the target update device 92. In response to the request, the target update device 92 transmits the firmware version information (Step S12). Then, the firmware update device 91 disconnects the connection with the target update device 92 (Step S13). Thus, the version information obtainment process is completed.

Next, the firmware update device 91 determines whether update is required based on the obtained firmware version information. No update is required if the latest version of firmware is installed in the target update device 92. If it is determined that no update is required, no further process is performed until there is a triggering for performing the version information obtainment process again. On the other hand, if it is determined that update is required (Step S14), the following firmware transmittal process is executed.

In this process, the firmware update device 91, in a manner similar to Step S11, transmits the ID and the password to the target update device 92, and establishes an FTP connection (Step S15). Then, the firmware update device 92 transmits firmware for updating to the target update device 92 (Step S16). After receiving the firmware, the target update device 92 performs a firmware updating process (Step S17). After the updating is completed, the target update device 92 resets and reboots itself, to thereby validate the new firmware (Step S18). The FTP connection is disconnected by the resetting of the target update device 91. Thus, the firmware transmittal process is completed.

By performing the above-described processes, firmware of the target update device 92 can be updated when necessary. Furthermore, with use of the same password, the version information obtainment process and the firmware transmittal process may be performed again as shown in the bottom portion of FIG. 26 using the same reference numerals (step numerals).

Since the FTP communication is performed without encoding of data, the ID and the password are transferred through the network as plain text without being coded. Therefore, as shown in FIG. 27, the ID and the password can be extracted from transferred data packets by monitoring a communication path between the firmware update device 91 and the target update device 92 with use of a packet monitor 93. Abuse of this system may enable a third person to pretend (spoof) to be the firmware update device 91 and access the target update device 92, thereby fraudulently updating the firmware.

Therefore, repetitive use of the password transmitted by FTP, as shown in FIG. 26, raises a problem from the aspect of security.

This problem applies not only to firmware that is to be updated, but also to, for example, application programs.

It is to be noted that in a case where a communication path such as PSTN, leased line, RS-485 shown in Japanese Laid-Open Patent Application No. 2002-28066 is used, communication is performed with use of individual communication protocol(s). Accordingly, communication cannot be monitored unless each device is analyzed (hardware-wise), and unless the protocols are obtained. Therefore, since monitoring of communication is difficult in the aforementioned case, the above-described Japanese Laid-Open Patent Application No. 2002-28066 does not mention the problem of security.

Nevertheless, in a case of establishing a software update system using Internet standard technology such as TCP/IP, solving the above-described problem of security is important.

As a protocol developed and used for solving the problem, there is, for example, SSL (Secure Socket Layer) which is a communication protocol serving to encode the content of communications. In communicating with this protocol, public key encryption and common key encryption are combined for enabling verification of the communication opponent, and encoding of information with the protocol prevents tampering and/or tapping.

By communicating with the SSL, the firmware update device 91 and the target update device 92 can safely exchange common keys and thus communicate safely. Nevertheless, a communication type including an encoding process, such as the above-described communication with the SSL protocol, requires a larger workload for verification and data transfer compared to that of FTP, which requires no encoding process.

This may have an effect, particularly, in a case of transmitting large-sized data files such as software. However, the problem with the amount of process workload is shared not only with FTP or SSL, but with other protocols as well.

SUMMARY OF THE INVENTION

It is a general object of the present invention to provide a software update device capable of communicating with a target update device via a network, the software update device including: a certification information setting unit for generating a first certification information, and transmitting the first certification information to the target update device via a first communication path; a certification requesting unit for transmitting a second certification information to the target update device, and requesting the target update device to execute a certification process with the first and second certification information; and a transmitting unit for transmitting an update software for updating a software of the target update device to the target update device via a second communication path when the certification process succeeds, the second communication path having a process load less than that of the first communication path.

According to an embodiment of the present invention, the software update device may further include a certification information invalidation requesting unit for requesting the target update device to invalidate the first certification information subsequent to the transmittal of the update software.

In a software update device according to an embodiment of the present invention, the software of the target update device may be updated when requested by an external unit.

The software update device according to an embodiment of the present invention may further include a notification unit for notifying a result of updating the software of the target update device to the external unit.

In a software update device according to an embodiment of the present invention, the first communication path may be a communication path for communicating by using SSL.

In a software update device according to an embodiment of the present invention, the second communication path may be a communication path for communicating by using FTP.

In a software update device according to an embodiment of the present invention, data transmitted via the first communication path may be encoded, wherein data transmitted via the second communication path may not be encoded.

Furthermore, the present invention provides a software update system including: a software update device; and a target update device in communication with the software update device; wherein the software update device has: a certification information setting unit for generating a first certification information, and transmitting the first certification information to a target update device via a first communication path, a certification requesting unit for transmitting a second certification information to the target update device, and requesting the target update device to execute a certification process with the first and second certification information, and a transmitting unit for transmitting an update software for updating a software of the target update device to the target update device via a second communication path when the certification process succeeds, the second communication path having a process load less than that of the first communication path; wherein the target update device has: a memory unit for storing the first certification information, a certification unit for executing the certification process by using the first and second certification information when requested to execute the certification process, and returning a result of the certification process to the software update device, and an updating unit for receiving the update software when the certification process succeeds, and updating the software of the target update device.

In the software update system according to an embodiment of the present invention, the software update device may further have a certification information invalidation requesting unit for transmitting an invalidation request to invalidate the first certification information to the target update device subsequent to the transmittal of the update software, and wherein the target update device may further have a certification information invalidating unit for invalidating the first certification information when receiving the invalidation request.

In the software update system according to an embodiment of the present invention, the target update device may further have: a restarting unit for restarting the target update device after the software is updated by the updating unit, a start notification transmitting unit for transmitting a start notification informing that the target update device is started to the software update device when the target update device is started, and a version information transmitting unit for transmitting version information of the target update device in response to a request from the software update device; wherein the software update device may further have a version information unit for obtaining the version information by requesting the target update device to transmit the version information when the start notification is received after the transmittal of the update software, and confirming the update by comparing with version information of the transmitted update software.

In the software update system according to an embodiment of the present invention, the first communication path may be a communication path for communicating by using SSL.

In the software update system according to an embodiment of the present invention, the second communication path may be a communication path for communicating by using FTP.

In the software update system according to an embodiment of the present invention, data transmitted via the first communication path may be encoded, wherein data transmitted via the second communication path may not be encoded.

Furthermore, the present invention provides a software update method using a software update device capable of communicating with a target update device via a network, the method comprising the steps of: generating a first certification information; transmitting the first certification information to the target update device via a first communication path; transmitting a second certification information to the target update device; requesting the target update device to execute a certification process with the first and second certification information; and transmitting an update software for updating a software of the target update device to the target update device via a second communication path when the certification process succeeds, the second communication path having a process load less than that of the first communication path.

In the software update method according to an embodiment of the present invention, the method may further include a step of requesting the target update device to invalidate the first certification information subsequent to the transmittal of the update software.

In the software update method according to an embodiment of the present invention, the software of the target update device may be updated when requested by an external unit.

In the software update method according to an embodiment of the present invention, the method may further include a step of notifying a result of updating the software of the target update device to the external unit.

In the software update method according to an embodiment of the present invention, the method may further include the steps of: receiving a start notification informing that the target update device is started; obtaining version information of the software of the target update device from the target update device when the start notification is received after the transmittal of the update software; and confirming the update by comparing with version information of the transmitted update software.

In the software update method according to an embodiment of the present invention, the first communication path may be a communication path for communicating by using SSL.

In the software update method according to an embodiment of the present invention, the second communication path may be a communication path for communicating by using FTP.

In the software update method according to an embodiment of the present invention, data transmitted via the first communication path may be encoded, wherein data transmitted via the second communication path may not be encoded.

Furthermore, the present invention provides a program to be installed or executed by a computer for controlling a software update device capable of communicating with a target update device via a network, the program including: a generating function for generating a first certification information; a transmitting function for transmitting the first certification information to the target update device via a first communication path; a requesting function for requesting the target update device to store the first certification information; a transmitting function for transmitting a second certification information to the target update device; a requesting function for requesting the target update device to execute a certification process with the first and second certification information; and a transmitting function for transmitting an update software for updating a software of the target update device to the target update device via a second communication path when the certification process succeeds, the second communication path having a process load less than that of the first communication path.

In the program according to an embodiment of the present invention, the program may further include a function of requesting the target update device to invalidate the first certification information subsequent to the transmittal of the update software.

In the program according to an embodiment of the present invention, the software of the target update device may be updated when requested by an external unit.

In the program according to an embodiment of the present invention, the program may further include a step of notifying a result of updating the software of the target update device to the external unit.

In the program according to an embodiment of the present invention, the program may further include the functions of: a receiving function for receiving a start notification informing that the target update device is started; an obtaining function for obtaining version information of the software of the target update device from the target update device when the start notification is received after the transmittal of the update software; and a confirming function for confirming the update by comparing with version information of the transmitted update software.

In the program according to an embodiment of the present invention, the first communication path may be a communication path for communicating by using SSL.

In the program according to an embodiment of the present invention, the second communication path may be a communication path for communicating by using FTP.

In the program according to an embodiment of the present invention, data transmitted via the first communication path may be encoded, wherein data transmitted via the second communication path may not be encoded.

Furthermore, the present invention provides a communication device capable of communicating with a software update device via a network, the communication device including: a certification information setting unit for generating a first certification information, and transmitting the first certification information to the software update device; a certifying unit for executing a certification process, when receiving a second certification information from the software update device, by comparing the first and second certification information; and an updating unit for receiving an update software for updating a software of the communication device from the software update device via a second communication path when the certification process succeeds, and updating the software of the communication device, the second communication path having a process load less than that of the first communication path.

In the communication device according to an embodiment of the present invention, the communication device may further include a certification information invalidating unit for invalidating the first certification information subsequent to the transmittal of the update software.

In the communication device according to an embodiment of the present invention, the communication device may further include a control part for instructing update of the software of the communication device.

In the communication device according to an embodiment of the present invention, the communication device may further include: a restarting unit for restarting the communication device after the software is updated; a start notification transmitting unit for transmitting a start notification informing that the communication device is started to the software update device when the communication device is started, and a version information transmitting unit for transmitting version information of the communication device in response to a request from the software update device after the start after the transmittal of the start notification.

In the communication device according to an embodiment of the present invention, the first communication path may be a communication path for communicating by using SSL.

In the communication device according to an embodiment of the present invention, the second communication path may be a communication path for communicating by using FTP.

In the communication device according to an embodiment of the present invention, data transmitted via the first communication path may be encoded, wherein data transmitted via the second communication path may not be encoded.

Furthermore, the present invention provides a software update system including: a communication device; and a software update device in communication with the communication device; wherein the communication device may have: a certification information setting unit for generating a first certification information, and transmitting the first certification information to the software update device, a certifying unit for executing a certification process, when receiving a second certification information from the software update device, by comparing the first and second certification information, and an updating unit for receiving an update software for updating a software of the communication device from the software update device via a second communication path when the certification process succeeds, and updating the software of the communication device, the second communication path having a process load less than that of the first communication path; wherein the software update device may have: a memory unit for storing the first certification information, a certification requesting unit for transmitting the second certification information to the communication device, and requesting the communication device to execute the certification process with the first and second certification information, and a transmitting unit for transmitting the update software to the communication device via the second communication path when the certification process succeeds.

In the software update system according to an embodiment of the present invention, the communication device may further have a certification information invalidating unit for invalidating the first certification information subsequent to the transmittal of the update software.

In the software update system according to an embodiment of the present invention, the communication device may further have: a restarting unit for restarting the communication device after the software is updated, a start notification transmitting unit for transmitting a start notification informing that the communication device is started to the software update device when the communication device is started, and a version information transmitting unit for transmitting version information of the communication device in response to a request from the software update device; wherein the software update device further has a version information unit for obtaining the version information by requesting the communication device to transmit the version information when the start notification is received after the transmittal of the update software, and confirming the update by comparing with version information of the transmitted update software.

In the software update system according to an embodiment of the present invention, the first communication path may be a communication path for communicating by using SSL.

In the software update system according to an embodiment of the present invention, the second communication path may be a communication path for communicating by using FTP.

In the software update system according to an embodiment of the present invention, data transmitted via the first communication path may be encoded, wherein data transmitted via the second communication path may not be encoded.

Furthermore, the present invention provides a software update method using a communication device capable of communicating with a software update device via a network, the method including the steps of: generating a first certification information; transmitting the first certification information to the software update device; executing a certification process, when receiving a second certification information from the software update device, by comparing the first and second certification information; receiving an update software for updating a software of the communication device from the software update device via a second communication path when the certification process succeeds; and updating the software of the communication device, the second communication path having a process load less than that of the first communication path.

In the software update method according to an embodiment of the present invention, the method may further include a step of invalidating the first certification information subsequent to the transmittal of the update software.

In the software update method according to an embodiment of the present invention, the method may further include a step of updating the software in response to an instruction to update the software from a control part.

In the software update method according to an embodiment of the present invention, the method may further include the steps of: restarting the communication device after the software is updated; transmitting a start notification informing that the communication device is started to the software update device when the communication device is started; and transmitting version information of the communication device in response to a request from the software update device after the start after the transmittal of the start notification.

In the software update method according to an embodiment of the present invention, the first communication path may be a communication path for communicating by using SSL.

In the software update method according to an embodiment of the present invention, the second communication path may be a communication path for communicating by using FTP.

In the software update method according to an embodiment of the present invention, data transmitted via the first communication path may be encoded, wherein data transmitted via the second communication path may not be encoded.

Furthermore, the present invention provides a program to be installed or executed by a computer for controlling a communication device capable of communicating with a software update device via a network, the program including: a generating function for generating a first certification information; a transmitting function for transmitting the first certification information to the software update device; an executing function for executing a certification process, when receiving a second certification information from the software update device, by comparing the first and second certification information; a receiving function for receiving an update software for updating a software of the communication device from the software update device via a second communication path when the certification process succeeds; and an updating function for updating the software of the communication device, the second communication path having a process load less than that of the first communication path.

In the program according to an embodiment of the present invention, the program may further include a function of invalidating the first certification information subsequent to the transmittal of the update software.

In the program according to an embodiment of the present invention, the program may further include a function of updating the software in response to an instruction to update the software from a control part.

In the program according to an embodiment of the present invention, the program may further include: a restarting function for restarting the communication device after the software is updated; a transmitting function for transmitting a start notification informing that the communication device is started to the software update device when the communication device is started; and a transmitting function for transmitting version information of the communication device in response to a request from the software update device after the start after the transmittal of the start notification.

In the program according to an embodiment of the present invention, the first communication path may be a communication path for communicating by using SSL.

In the program according to an embodiment of the present invention, the second communication path may be a communication path for communicating by using FTP.

In the program according to an embodiment of the present invention, data transmitted via the first communication path may be encoded, wherein data transmitted via the second communication path may not be encoded.

Other objects, features and advantages of the present invention will become more apparent from the following detailed description when read in conjunction with the accompanying drawings.

BRIEF DESCRIPTION OF THE DRAWINGS

FIG. 12 is a diagram showing an example of a password list used as reference by an intermediary device shown in FIG. 3 for updating firmware of an image processing device;

DETAILED DESCRIPTION OF THE PREFERRED EMBODIMENTS

In the following, embodiments of the present invention will be described with reference to the accompanying drawings.

First, an exemplary structure of a communication device (software update device) and a software update system according to an embodiment of the present invention will be described.

Figure 1:
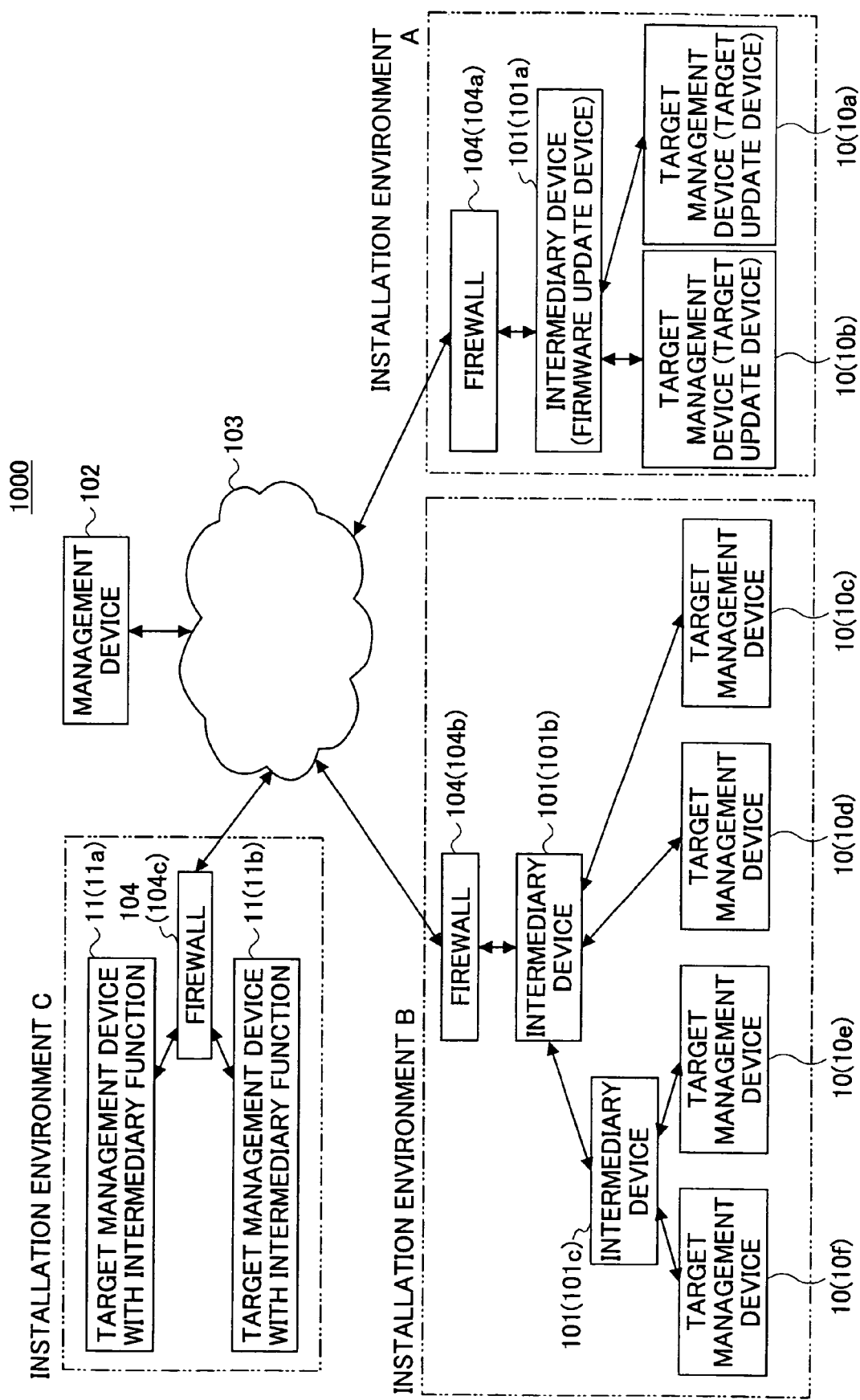
FIG. 1 is a schematic diagram showing an exemplary structure of a remote management system including a software update system according to an embodiment of the present invention.

FIG. 1 is a schematic diagram showing exemplary structure of a remote management system including a software update system 1000 according to an embodiment of the present invention, in which an intermediary device 101 is a software update device and, a target management device 10 is a communication device and/or a target update device. Although the intermediary device 101 may also be a communication device, being a target update device, here in this example, the intermediary device 101 is described as the software update device, and the target management device 10 as the target update device. Although firmware is described as the target update software in this example, other software such as application programs may also serve as the target update software.

The software update system 1000, serving as a part of a remote management system, has the target management device(s) 10 which is a communication device provided with a communication function, for example, an image processing device including a printer, a fax machine, a digital copier, a scanner, a complex machine, a network household electric appliance, a vending machine, a medical appliance, an electric power device, an air conditioning system, a metering system for gas, water, and electricity, a multipurpose computer, an automobile, or an aircraft. The software update system 1000 allows firmware to be transmitted from the intermediary device 101 to the target management device 10 according to necessity, to thereby update the firmware of the target management device 10.

Furthermore, the software update system 1000 (remote management system) has the intermediary device 101, which is a remote management intermediary device connected to the target management device 10 and LAN (Local Area Network), and the management device (external unit) 102, which functions as a server device connected via the intermediary device 101 and the Internet 103 (there may also be other networks such as public lines). The management device (external unit) 102 serves to concentrate remote management in each target management device 10 via the intermediary device 101. The intermediary device 101 and the target management device 10 may be provided with various hierarchical structures according to the environment for use.

For example, in installation environment A shown in FIG. 1, an intermediary device 101*a*, enabling direct HTTP connection with the management device 102, has a simple hierarchical structure having target management devices 10*a*, 10*b* arranged therebelow. However, in a case where four target management devices 10 are required to be installed in installation environment B, there would be an excessive load if merely one intermediary device 101 were installed. Therefore, an intermediary device 101*b*, enabling direct HTTP connection with the management device 102, has a hierarchical structure having not only target management devices 10*c*, 10*d* arranged therebelow, but also another intermediary device 101*c*, and target management devices 10*e*, 10*f* arranged below the intermediary device 101*c*. In this case, information sent from the management device 102 for remotely managing the target management devices 10*e*, 10*f* is bound to reach the target management devices 10*e*, 10*f* via the intermediary device 101*b* and the intermediary device 101*c* being the node ranked lower than the intermediary device 101*b*.

Furthermore, as in installation environment C, for example, target management device(s) 11 (11*a*, 11*b*) which is target management device a 10 provided with the intermediary function of the intermediary device 101, may be connected with the management device 102 through the Internet 103 without having a separate intermediary device situated therebetween.

Although not shown in the drawing, another target management device 10 may be arranged below the target management device with the intermediary function 11.

It is to be noted that a firewall 104 (104*a*, 104*b*, 104*c*) is installed in each of the environments.

In this remote management system, the intermediary device 101 is provided with an application program for controlling and managing the target management device 10 connected thereto.

The management device 102 is provided with an application program for controlling and managing each of the intermediary devices 101 and the target management devices 10 via the intermediary devices 101. Each of the nodes of the remote management system, including the target management device 10, employ RPC (Remote Procedure Call) to thereby transmit a "request" requesting for a process corresponding to a method of a mutually provided application program, and obtain a "response" resulting from the requested process.

That is, the intermediary devices 101 and the target management devices 102 generate a request, deliver the request to the management device 102, and obtain a response corresponding to the request. The management device 102, meanwhile, generates a request for the intermediary devices 101, delivers the request to the intermediary devices 101, and obtains a response corresponding to the request. The request includes requests which are transmitted to each of the target management devices 10 via the intermediary devices 101, to thereby allow obtainment of responses from the target management devices 10 via the intermediary devices 101. It is to be noted that known protocols (communication standards), technologies, and specifications may be employed for executing the RPC, for example, SOAP (Simple Object Access Protocol), HTTP (HyperText Transfer Protocol), FTP, COM (Component Object Model), and/or CORBA (Common Object Request Broker Architecture).

Figure 2A:
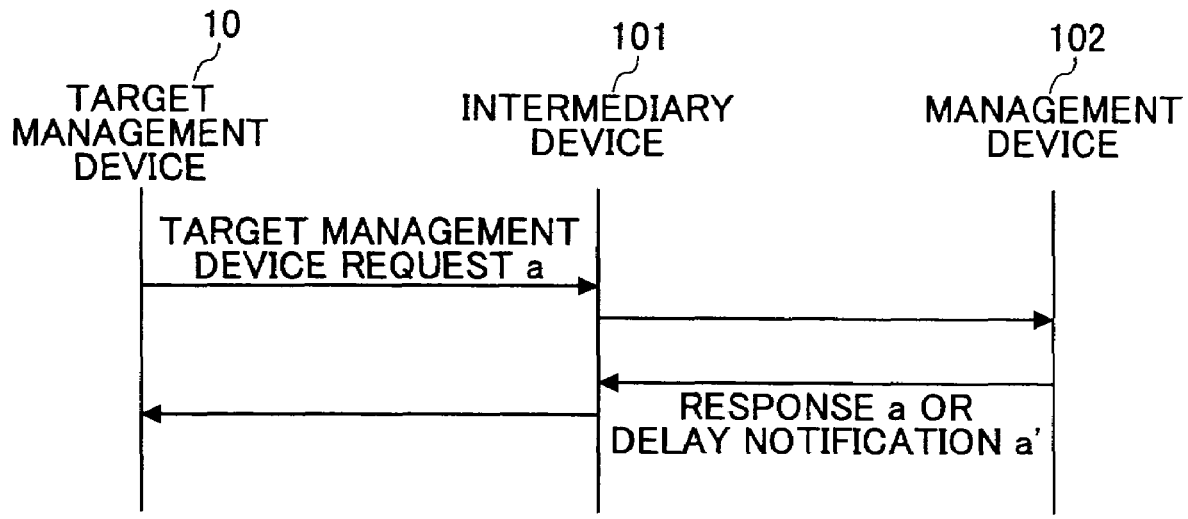
FIGS. 2A and 2B are schematic diagrams showing a data communication model of a remote management system according to an embodiment of the present invention.
Figure 2B:
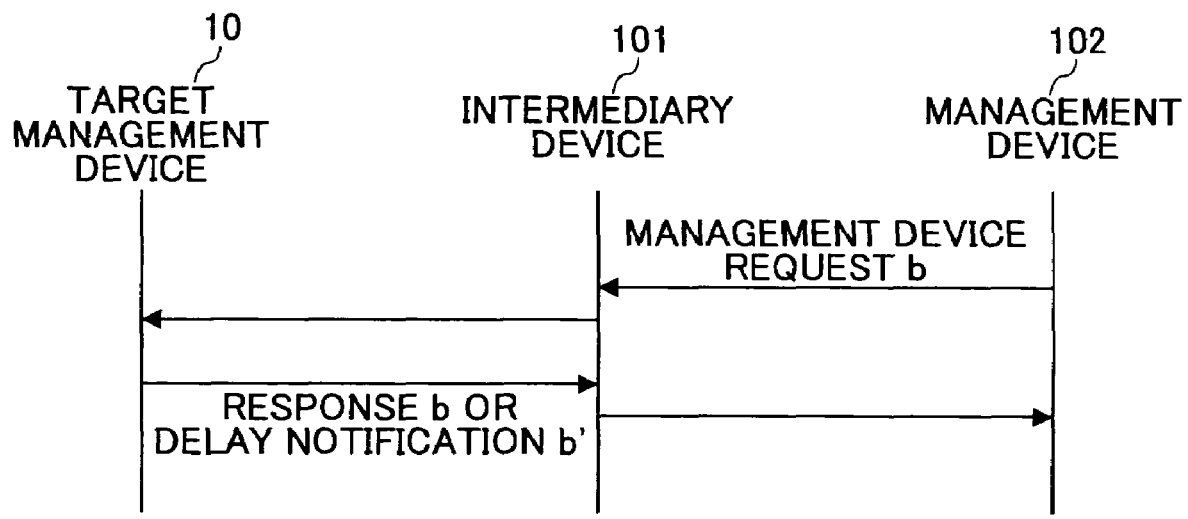

FIGS. 2A and 2B show exemplary overall data transmission-reception models according to an embodiment of the present invention.

FIG. 2A is a case where a request for the management device 102 is generated by the target management device 10. In this case, the target management device 10 generates a target management device request a, and the management device 102, having received the request via the intermediary device 101, returns a response a corresponding to the request a. The intermediary device 101 shown in FIG. 2A may be arranged in plural numbers (e.g. installation environment B shown in FIG. 1). It is to be noted that FIG. 2A also shows a case of returning a response delay notice a'. In this case, the management device 102 receives the target management device a via the intermediary device 101, and sends a response delay notice a' when it is determined that a response a corresponding to the target management device request a cannot be returned instantaneously, thereby, temporarily disconnecting connection, and newly delivering a response corresponding to the request during the time of the next connection.

FIG. 2B is a case where a request for the target management device 10 is generated by the management device 102. In this case, the management device 102 generates a management device request b, and the target management device 10, having received the request b via the intermediary device 101, returns a response b corresponding to the request b. It is to be noted that FIG. 2B also shows a case of returning a response delay notice b', when a response cannot be returned instantaneously.

An exemplary physical structure of the management device 102 shown in FIG. 1 includes, although not shown, a CPU, a ROM, a RAM, a non-volatile memory, and a network interface card (hereinafter referred to as "NIC"), for example.

Figure 3:
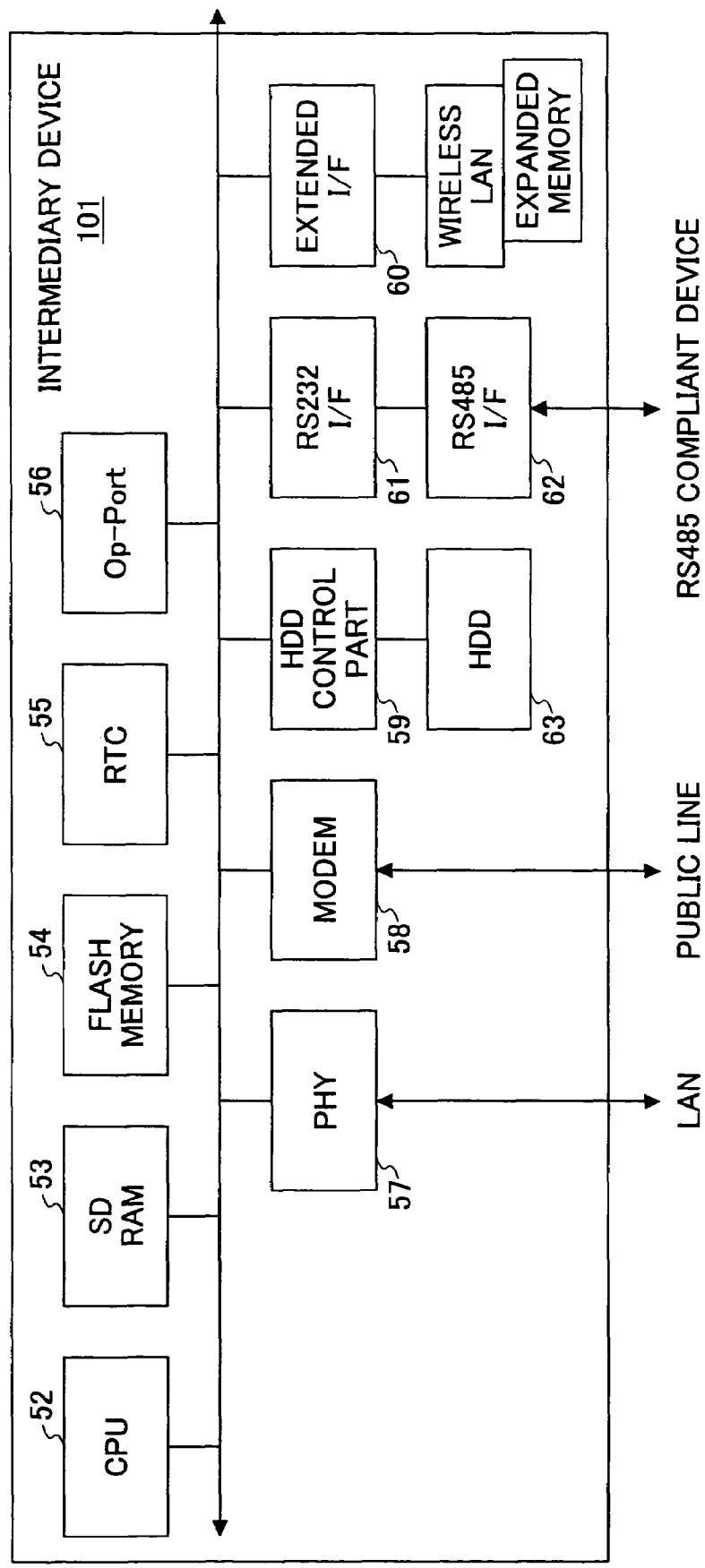
FIG. 3 is a block diagram showing an exemplary hardware structure of an intermediary device in a remote management system according to an embodiment of the present invention.

An exemplary physical structure of the intermediary device 101 shown in FIG. 1 is shown in FIG. 3. The physical structure of the intermediary device 101 includes, for example, a CPU 52, an SDRAM 53, a flash memory 54, an RTC (Real Time Clock) 55, an Op-Port 56, a PHY 57, a modem 58, an HDD control part 59, an extended I/F (InterFace) 60, an RS 232 I/F 61, an RS 485 I/F 62, and a HDD (Hard Disk Drive) 63. The intermediary device 101 is connected to a LAN via the PHY 57, and connected to the target management device 10 via the LAN. Although it is possible for the intermediary device 101 to be connected to the target management device 10 via the RS 232 I/F 61 and the RS 485 I/F 62, these interfaces are not used in this exemplary structure.

It is to be noted that the target management device with the intermediary function 11 may simply be a target management device 10 provided with the above-described units for performing the functions of the intermediary device 101. Alternatively, the target management device with the intermediary function 11 may perform the functions of the intermediary device 101 by using hardware resources of the target management device 10 (e.g. CPU, ROM, RAM) and enabling a CPU to execute a suitable application or program module.

Figure 4:
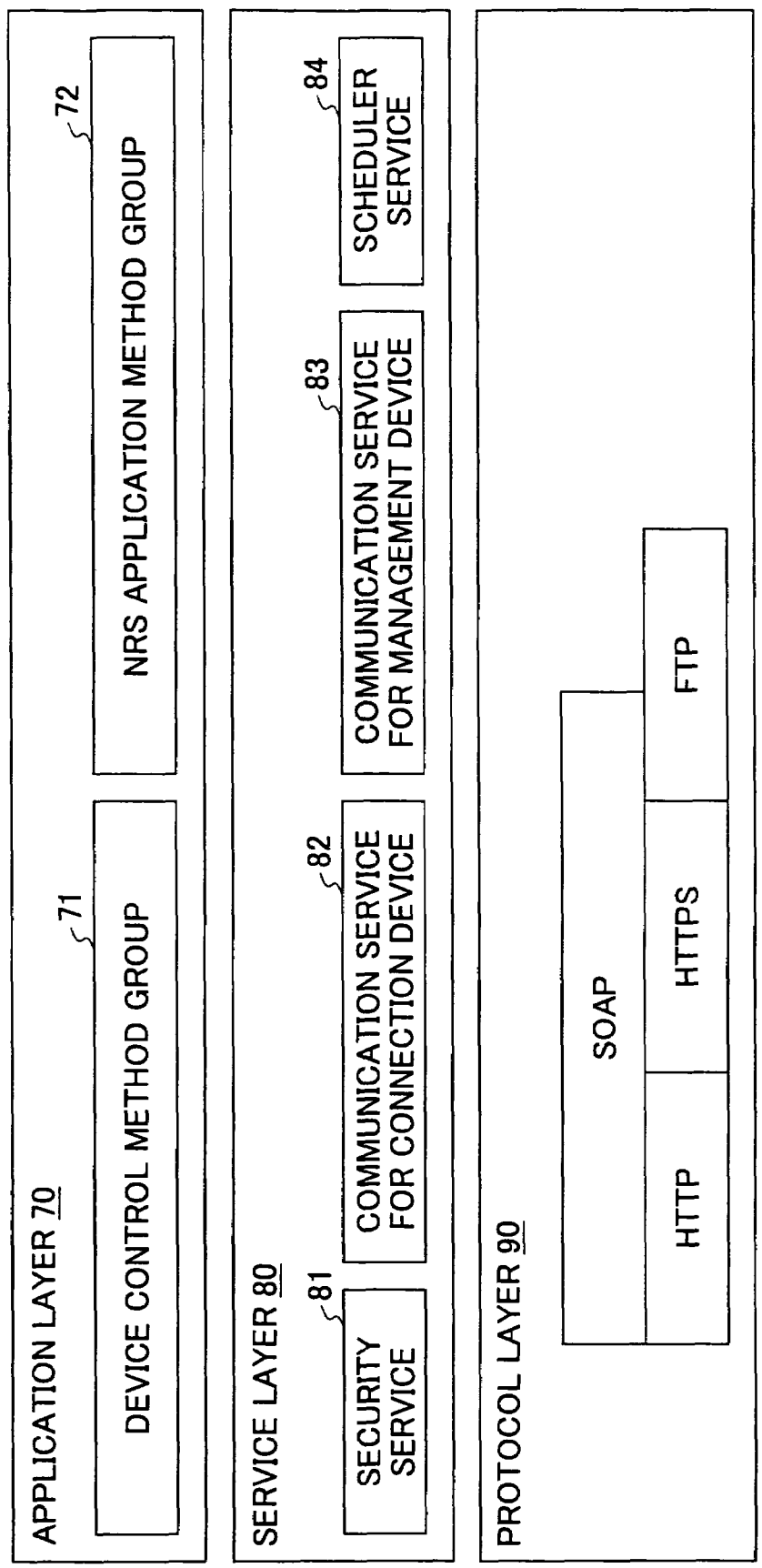
FIG. 4 is a block diagram showing an exemplary software structure of an intermediary device according to an embodiment of the present invention.

FIG. 4 is a block diagram showing an exemplary software structure of the intermediary device 101. As shown in FIG. 4, the intermediary device 101 comprises three layers, which are an application layer 70, a service layer 80, and a protocol layer 90. The programs included in these software layers are stored in the HDD, the SDRAM 53, or the flash memory 54, and are read out, whenever necessary, for execution by the CPU 52. The CPU 52 executes these programs whenever necessary, thereby controlling the intermediary device for enabling respective functions (e.g. functions of an authentication information setting part, an authentication requesting part, a transmitting part).

The application 70 in the software structure includes a device control method group 71 and an NRS (New Remote Service) application method group 72. The device control method group 71 includes respective methods, for example, setting of management object information, setting of devices, updating of software, changing setting of polling, log outputting, and activation processing, and serves as a program for executing a firmware updating process, information management of the target management device, and setting of communications.

The NRS application method group 72 includes respective methods, for example, log collecting, downloading of software, executing of device commands, notifying of supply, notifying of abnormalities, starting/installing of devices, confirming of device activity, serves as a program for responding to various notices and requests from the target management device 10, and enabling the target management device 10 to operate in accordance with the requests from the management device 102.

Next, the service layer 80 includes a security service 81, a communication service for a connection device 82, a communication service for a management device 83, and a scheduler service 84.

The security service 81 is a module that generates and/or executes jobs, for example, preventing fraudulent outflow of internal information.

The communication service for a connection device 82 is a module that generates and/or executes jobs, for example, searching for devices that are subjected to information obtainment, managing the connection with respect to the subjected device, transmitting-receiving files, managing parameters, and managing APL so that delivering and receiving of information may be achieved with respect to a network connection device connected to the intermediary device 101.

The communication service for the management device 83 serves as a module that generates and/or executes jobs, for example, receiving of commands with respect to the management device 102, transmitting-receiving of files, requesting of information, and transmitting of information (information notification). The scheduler service 84 is a module that deploys remote control application based on prescribed time information.

The protocol layer 90 includes methods for generating and/or executing jobs for executing delivering and receiving of information by using a protocol corresponding to the device subjected to transmitting-receiving of information. That is, the protocol layer 90 includes methods capable of controlling, for example, SOAP (Simple Object Access Protocol) for widely accommodating communication environments of network connection devices via LAN, and lower protocols as HTTP, HTTP (Hypertext Transfer Protocol Security), and FTP.

Figure 5:
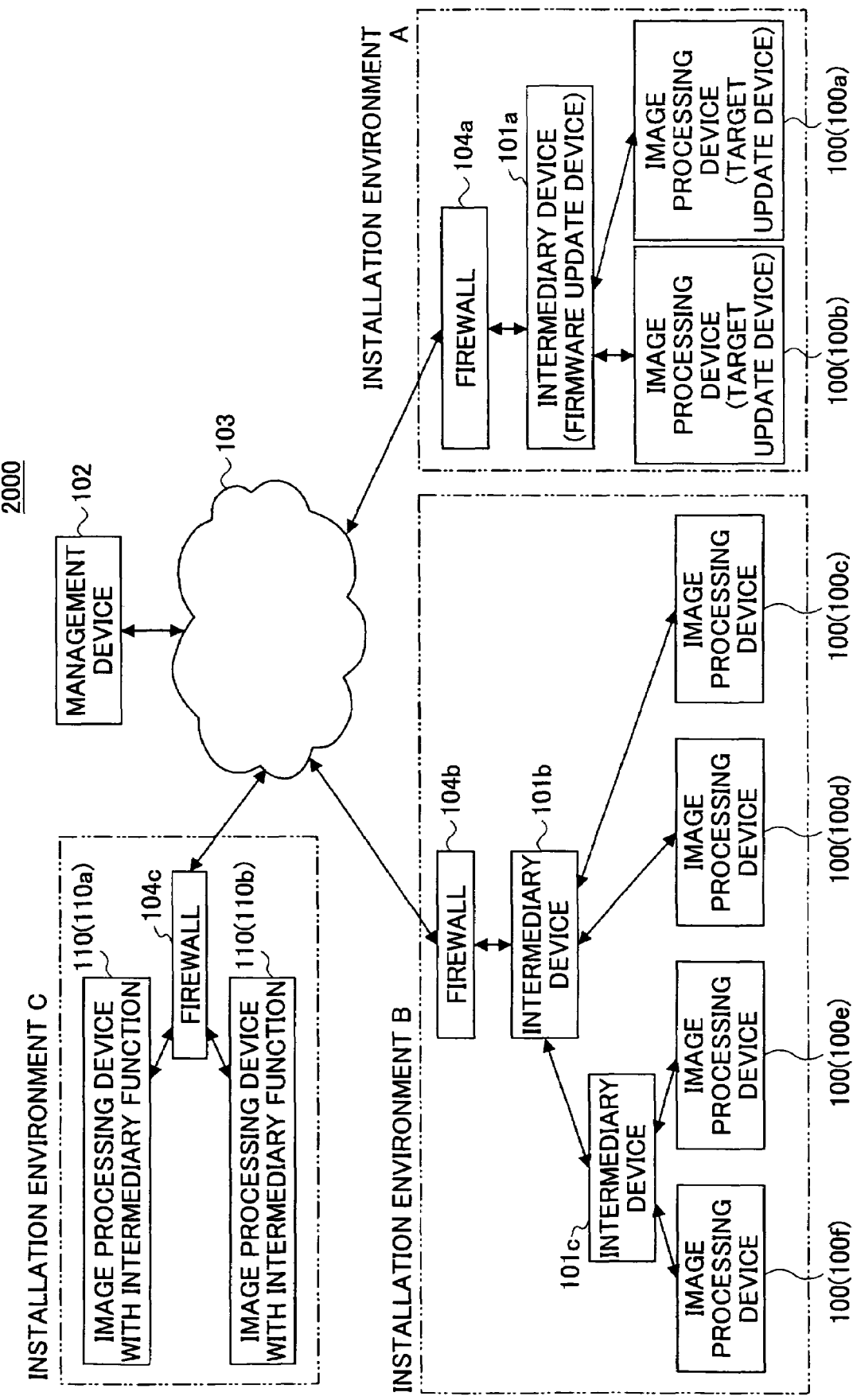
FIG. 5 is a schematic diagram showing an exemplary structure of a image processing device remote management system including a software update system according to an embodiment of the present invention, in which an image processing device is a target update device.

Next, as an example of the remote management system shown in FIG. 1, an image processing device remote management system employing an image processing device as the target management device is described. The remote management system includes the software updating system employing an image processing device as the target update device according to an embodiment of the present invention. FIG. 5 is a schematic diagram showing an exemplary structure of the image processing device remote management system including a software update system 2000 according to an embodiment of the present invention. Besides the target management device 10 being an image processing device 100, and the target management device with an intermediary function 11 being an image processing device with an intermediary function 110, the overall structure of the system is more or less the same as that of system shown in FIG. 1. Accordingly, further description thereof is omitted. It is to be noted that the software update system according to an embodiment of the present invention may comprise merely the intermediary device 101 serving as the software update device and the image processing device 100 serving as the target update device, but may also include, for example, the management device 102 or the firewall 104.

The image processing device 100 is a digital complex apparatus that includes a function of communicating with other external apparatuses, and functions of, for example, a copier, a facsimile, and/or a scanner, in which an application program for providing services of foregoing functions is installed. The image processing device with an intermediary function 110 is the image processing device 100 provided with the function of the intermediary device 101.

Next, an exemplary physical structure of the image processing device 100 is described with reference to FIG. 6.

Figure 6:
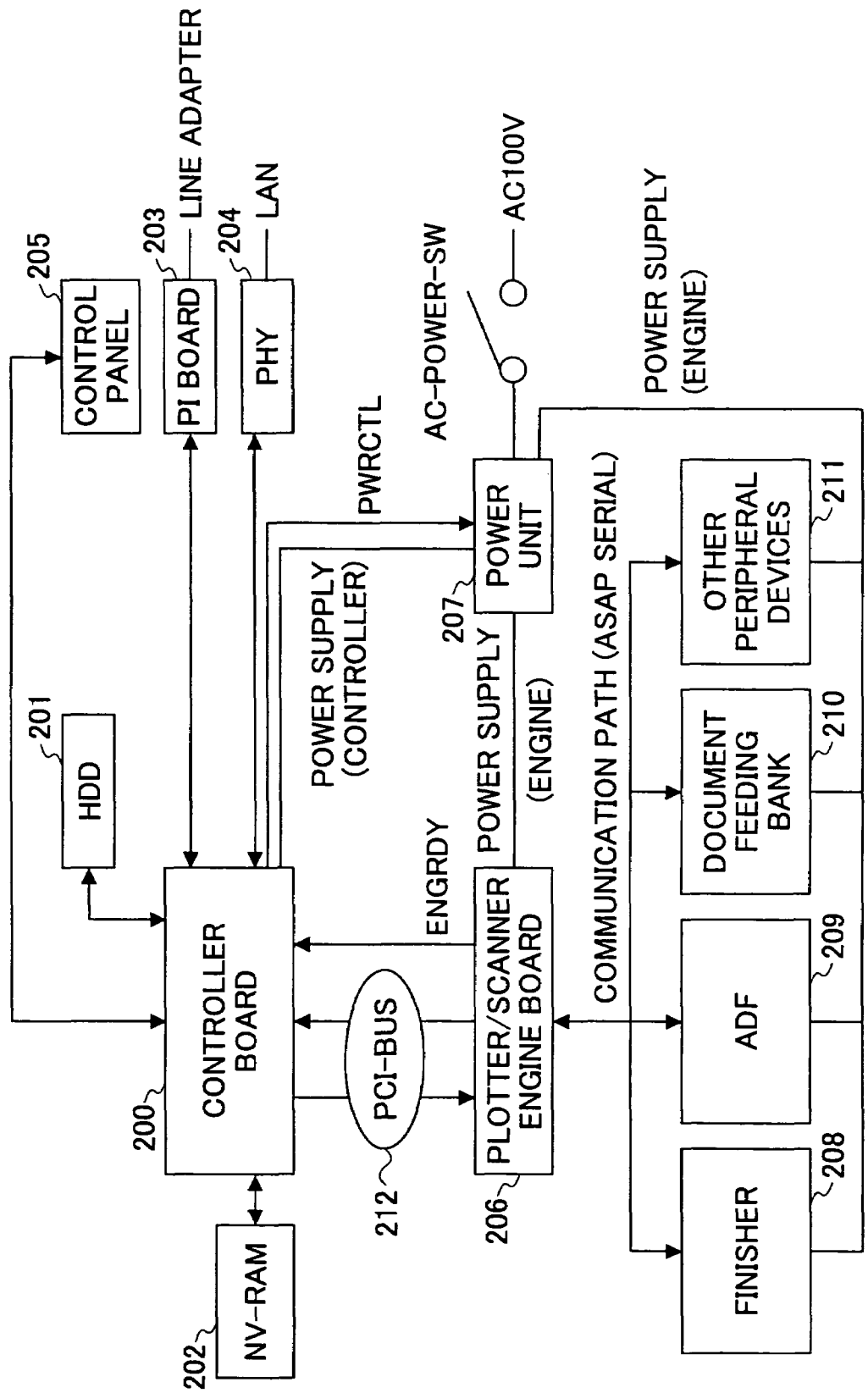
FIG. 6 is a block diagram showing an exemplary hardware structure of an image processing device in an image processing device remote management system according to an embodiment of the present invention.

FIG. 6 is a block diagram showing an exemplary physical structure of the inside of the image processing device 100. In FIG. 6, the image processing device 100 includes a controller board 200, a HDD (Hard Disk Drive) 201, an NV-RAM (non-volatile RAM) 202, PI (Personal Interface) board 203, a PHY 204, a control panel 205, a plotter/scanner engine board 206, an power source unit 207, a finisher 208, an ADF (Automatic Document Feeding apparatus) 209, a document feeding bank 210, and other peripheral devices 211.

Here, the controller board 200 corresponds to a control part which has, for example, CPU, ROM, and RAM, for controlling respective functions via a PCI-BUS (Peripheral Components Interconnect-Bus) 212. The HDD 201 corresponds to a memory part (storage part). The NV-RAM 202 corresponds to a memory part which is a non-volatile memory, for example, a flash memory.

The PI board 203 and the PHY 204 correspond to a communication part, for example, a communication board, for communicating with the external. The PI board 203 has an interface complying with the RS 485 standard, and is connected with a public line via a line adapter. The PHY 204 is an interface for communicating with an external device via a LAN, and provides plural communication units including an IEEE (Institute of Electrical and Electronic Engineers)

802.11b standard (compatible to wireless LAN) interface, an IEEE 1394 standard interface, and an IEEE 802.3 standard interface.

The control panel 205 is a user interface corresponding to a control part and a display part.

ENGRDY shown in FIG. 6 is a signal line for notifying the controller board 200 that initial setting on the engine side is finished, and that preparation for transmitting-receiving of commands with the controller board 200 is completed. PWRCTL shown in FIG. 6 is a signal line for controlling power supply to engine side from the controller board 200 side. Operation of the signal lines is described below.

Next, an exemplary software structure of the image processing device is described with reference to FIG. 7.

Figure 7:
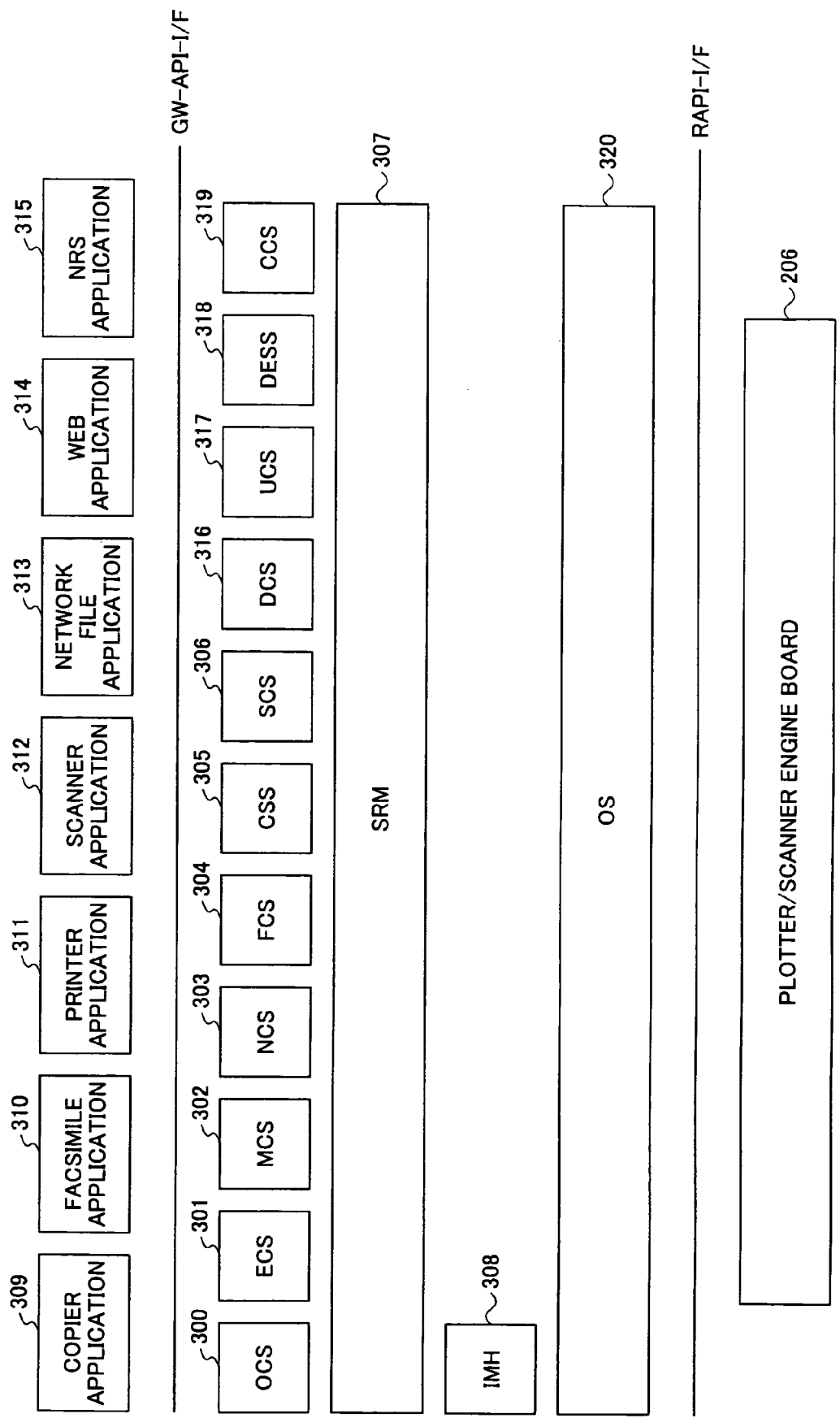
FIG. 7 is a block diagram showing an exemplary software structure of an image processing device according to an embodiment of the present invention.

FIG. 7 is a block diagram showing an exemplary software structure of the image processing device 100. The software structure of the image processing device 100 has an application module layer disposed as a topmost layer, and a service module layer disposed as a bottommost layer. The program included in these software layers are stored in the HDD, or the RAM of the controller board 200, and are read out, whenever necessary, for execution by the CPU of the controller board 200. The CPU executes these programs whenever necessary, thereby enabling execution of respective functions (e.g. functions of a memory part, an authentication part, an update part).

The software of the application module layer includes a program for enabling the CPU to function as a plurality of application controlling units for operating hardware resources and providing prescribed functions. The service module layer includes a program for enabling the CPU to function as a service controlling unit for intervening between hardware resources and respective application, to thereby accept operation requests from the plurality of application controlling units to the hardware resources, arbitrate operation requests, and control operation execution based on the operation requests.

OS 320 in FIG. 7, which is an operation system such as UNIX (registered trademark), executes, in parallel, each program in the service module layer and the application module layer as a process.

The service module layer is installed with an operation control service (OCS) 300, an engine control service (ECS) 301, a memory control service (MCS) 302, a network control service (NCS) 303, a facsimile control service (FCS) 304, a customer support system (CSS) 305, a system control service (SCS) 306, a system resource manager (SRM) 307, an image memory handler (IMH) 308, a deliver control service (DCS) 316, a user control service (UCS) 317, a data encryption security service (DESS) 318, and a safety cut control service (CCS) 319. The application module layer is installed with a copier application 309, a facsimile application 310, a printer application 311, a scanner application 312, a network file application 313, a Web application 314, and an NRS (New Remote Service) application 315.

Next, the above-described components (parts) are described in further detail.

The OCS 300 is a module for controlling the control panel 205.

The ECS 301 is a module for controlling an engine such as hardware resource.

The MCS 302, being a module for controlling memory, performs, for example, obtaining or opening of image memory, and usage of the HDD 201.

The NCS 303 is a module for performing an intermediary process between a network and each application program in the application module layer.

The FCS 304 is a module for performing, for example, facsimile transmission-reception, facsimile reading, and printing of received facsimile results.

The CSS 305 is a module, for example, for converting data during transmission-reception of data via a public line, and is also a module collecting the functions of the remote management via a public line.

The SCS 306 is a module for managing activation and termination of each application program of the application module layer corresponding to the content of the command.

The SRM 307 is a module for performing system control and resource management.

The IMH 308 is a module for managing a memory for temporarily storing image data.

The DCS 316 is a module for sending and receiving, for example, image files stored in (or to be stored in) the HDD 201 or the memory of the controller board 200 by using SMTP (Simple Mail Transfer Protocol) or FTP (File Transfer Protocol).

The UCS 317 is a module for managing user information such as destination information registered by the user or address information.

The DESS 318 is a module for performing verification of respective units using PKI or SSL, or external devices, and for performing communication decoding.

The CCS 319 is a module for performing a verification of verification information input by the image processing device 100.

The copier application 309 is an application program for performing a copying service.

The facsimile application 310 is an application program for performing a facsimile service.

The printer application 311 is an application program for performing a printer service.

The scanner application 312 is an application program for performing a scanner service.

The network file application 313 is an application program for performing a network file service.

The Web application 314 is an application program for performing a Web service.

The NRS application 315 is an application program for performing functions (including functions related to communication with the management device 102) as data conversion during transmission-reception of data via the network, and remote management via the network. The NRS application also performs a function of converting data received from an external device via the network into a data structure suited for processing by each application.

The processes executed by the CPU in accordance with each of the programs are, for convenience, described as being executed by the programs.

Next, operation between the ENGRDY signal and the PWRCTL signal is described with reference to FIGS. 8A, 8B and 8C.

Figure 8A:
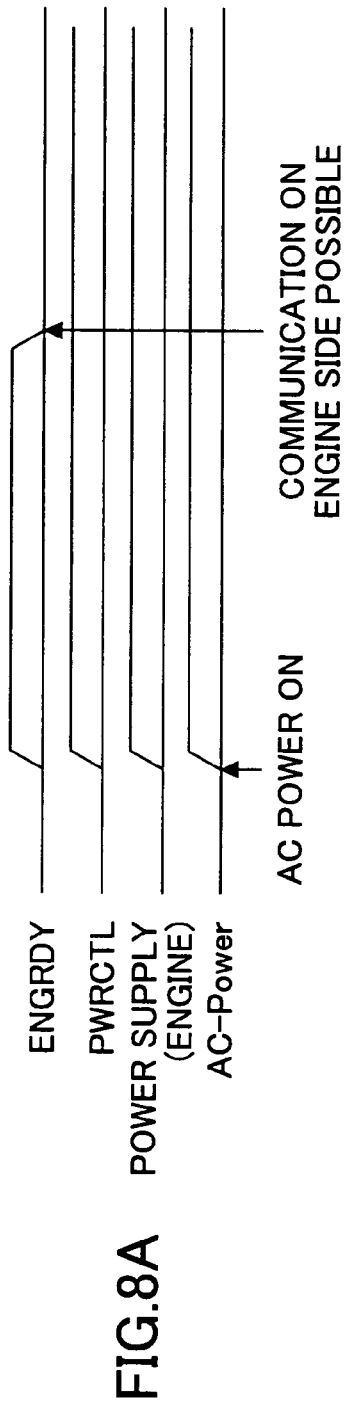
FIG. 8A through 8C are diagrams for explaining ENGRDY signals and PWRCTL signals of an image processing device according to an embodiment of the present invention.

FIG. 8A shows an example of an operation of the ENGRDY signal and the PWRCTL signal upon initiating the devices. When the electric power source of AC-Power is switched on, electric supply is initiated, and, at the same time, the ENGRDY signal is high. In this state, communication on the engine side cannot be performed. This is due to the fact that the initial setting on the engine side is not finished. When the initial setting on the engine side is finished after a prescribed period, communication on the engine side can be performed when the ENGRDY signal becomes LOW.

Figure 8B:
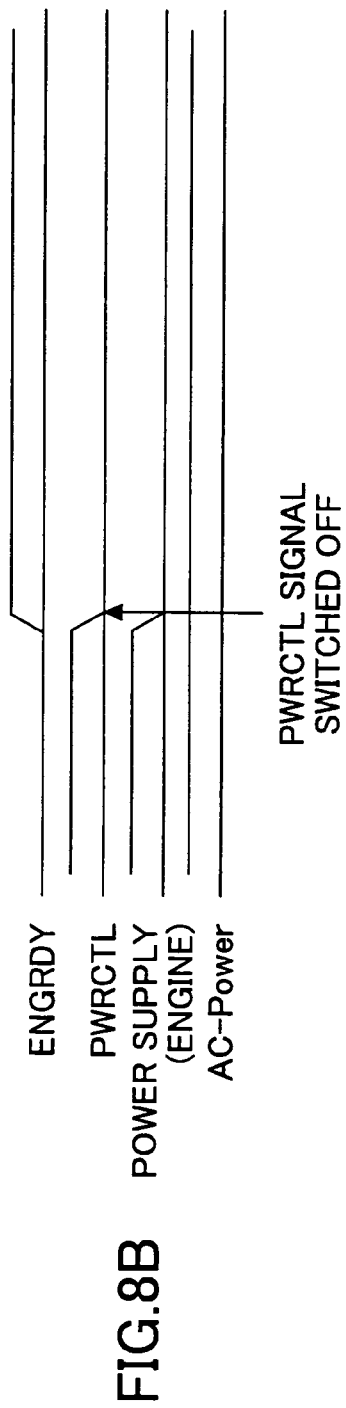

FIG. 8B shows an example of an operation of the ENGRDY signal and the PWRCTL signal when transferring to energy saving mode. The controller board switches the PWRCTL signal to "OFF" for transferring to the energy saving mode. At the same time, the power supply is stopped. Along with this, the ENGRDY signal becomes HIGH, to thereby transfer to the energy saving mode. Next, a case of returning from the energy saving is described with reference to FIG. 8C.

Figure 8C:
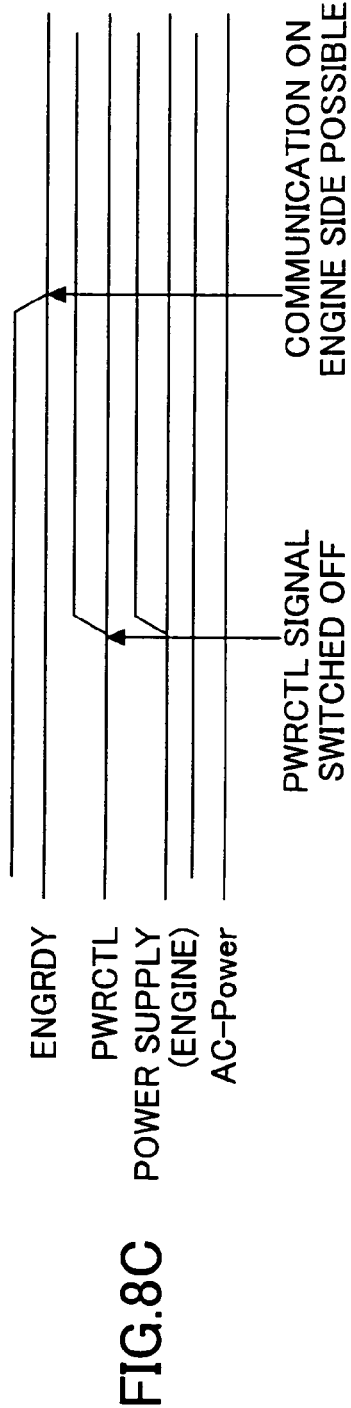

FIG. 8C shows an example of an operation of the ENGRDY signal and the PWRCTL signal when returning from the energy saving mode. In returning from the energy saving mode as shown in FIG. 8C, the controller board 200 switches the PWRCTL signal to "ON". At the same time, the power supply is started. As shown in FIG. 8A, the ENGRDY signal is in a HIGH state until the initial setting on the engine side is finished, and the ENGRDY signal is in a LOW state after the initial setting is finished where communication on the engine side becomes possible.

Next, an exemplary internal structure of the NRS application 315 included in the aforementioned software structure of the image processing device 100 is described with reference to FIG. 9.

Figure 9:
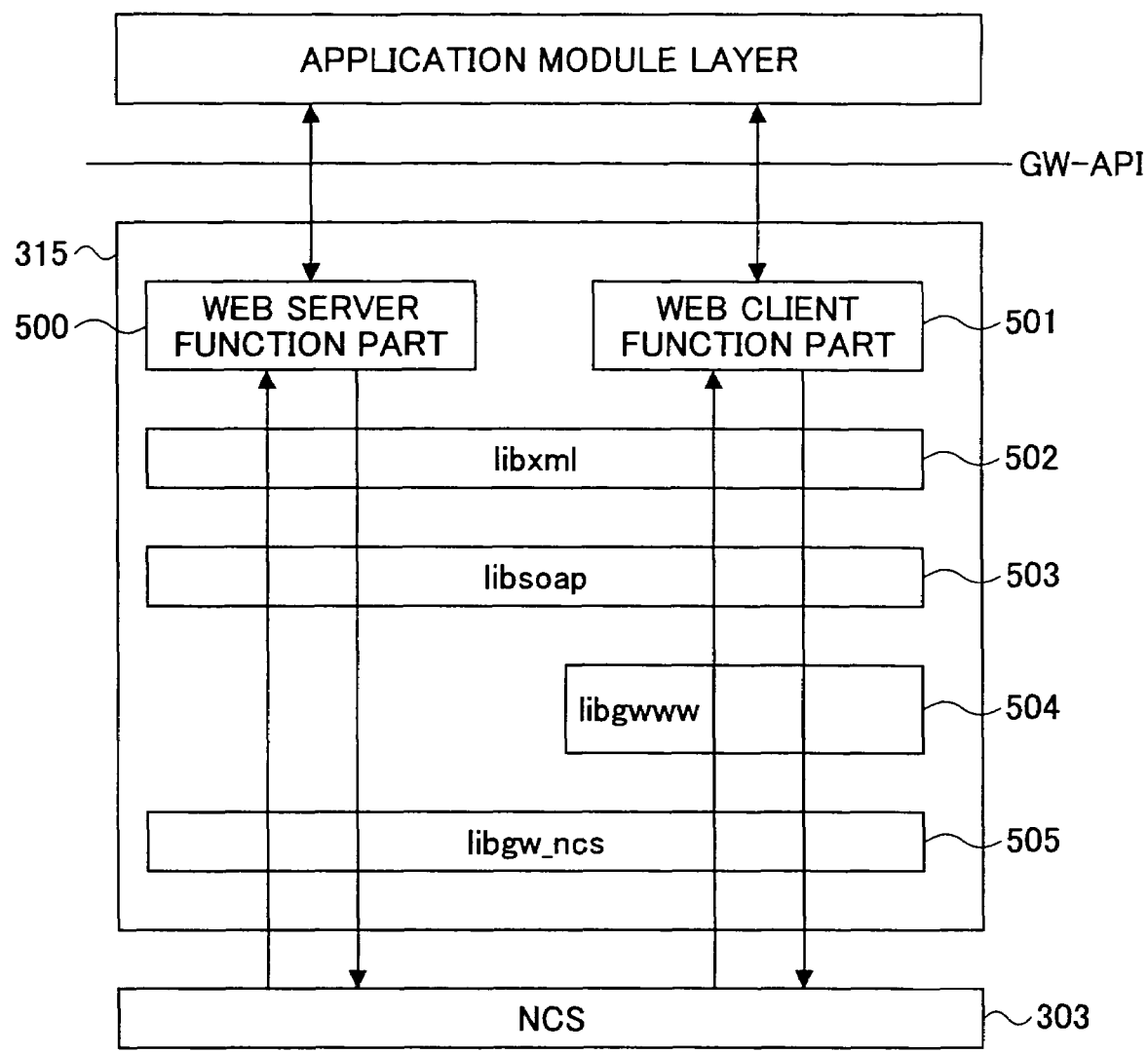
FIG. 9 is a functional diagram showing an exemplary structure of a Web service application of an image processing device according to an embodiment of the present invention.

FIG. 9 is a functional block diagram showing an exemplary structure of the NRS application 315. As shown in FIG. 9, the NRS application 315 performs processing between the application module layer and the NCS 303. A web server function part 500 performs a responding process in response to a request received from the external. The request may be, for example, a SOAP (Simple Object Access Protocol) request described in XML (Extensible Markup Language) format. A Web client function part 501 performs a process of issuing a request to the external. A libxml 502 is a library that processes data described in XML format, and a libsoap 503 is a library that processes SOAP. A libgwww 504 is a library that processes HTTP, and a libgw_ncs 505 is a library that processes for the NCS 303.

The SOAP request is received by the PHY 204. Then, a SOAP document including a SOAP header and a SOAP body is delivered, in HTML message form, to the NRS application 315 via the NCS 303. In the NRS application 315, the SOAP body is extracted from the SOAP document by using the libsoap 503, and is interpreted by using the libxml 502, to thereby generate a DOM (Document Object Model) tree. The Web server function part 500 converts this into a data structure allowing suitable processing by each of the applications and delivers this to an application corresponding to a command included in the SOAP body.

In a case where the program of the application is, for example, described in C language, the data structure is a C language structure, and data can be stored to the application by calling the program of the application with the data structure as an argument.

Figure 10:
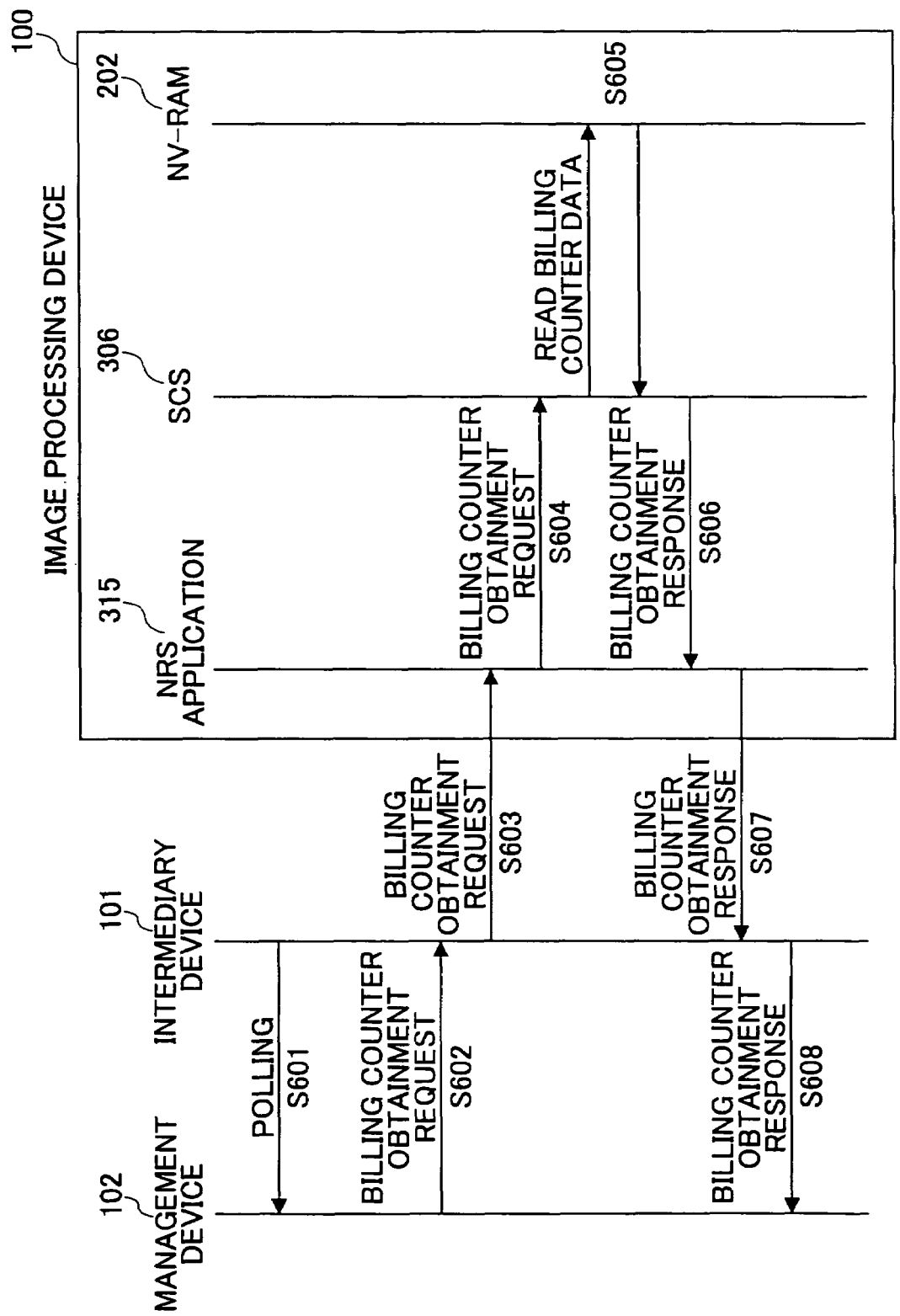
FIG. 10 is a sequence diagram showing an exemplary communication sequence during data communication executed in an image processing device remote management system shown in FIG. 3.

Next, an example of the communication sequence during data transmission-reception in the image processing device remote management system shown in FIG. 5 is described with reference to FIG. 10. FIG. 10 is a diagram showing an example of a communication sequence during data communication between the management device, the intermediary device, and the image processing device.

In this example, the intermediary device 101 performs polling (inquiry whether there is a transmission request) with respect to the management device 102 (Step S601). That is, the intermediary device 101 generates a SOAP document added with identifiers for polling, and transmits the SOAP document to the management device 102 as an HTTP message. As shown in FIG. 5, since the firewall 104 is disposed between the intermediary device 101 and the management device 102, no communication session from the management device 102 to the intermediary device 101 (establishment of a communication path by requesting communication) can be provided. Therefore, even in a case where transmission of a request from the management device 102 to the intermediary device 101 (or to the image processing device 100 via the intermediary device 101) is desired, polling from the intermediary device 101 is required.

When the management device 102 receives the HTTP message from the intermediary device 101, the management device 102 generates a SOAP document indicating a billing counter obtainment request, and transmits the SOAP document, as an HTTP message corresponding to polling, to a corresponding intermediary device 101 (transmission origin of the received SOAP message) (Step S602). During this step, the corresponding intermediary device 101 is recognized based on the identifier added to the SOAP document in the received HTTP message. Accordingly, if it is a response (HTTP response) to communication from the inner side of the firewall 104 (HTTP request), data can be transmitted from the outer side to the inner side of the firewall.

When the intermediary device 101 receives the HTTP message from the management device 102, the intermediary device 101 generates a SOAP document indicating a billing counter obtainment request based on the HTTP message, and sends the request, as an HTTP message, to the NRS application of the image processing device connected thereto (Step S603).

The NRS application 315 notifies the SCS 306 of the billing counter obtainment request described in the SOAP document received from the intermediary device 101 (Step S604).

When the SCS 306 receives the notification of the billing counter obtainment request, the SCS 306 reads the billing counter data stored in the NV-RAM 202 (Step S605). Then, the SCS 306 delivers the read billing counter data (response data) to the NRS application 315 (Step S606).

When the NRS application 315 receives (obtains) the billing counter data from the SCS 306, the NRS application 315 generates a SOAP document indicating the content of the data for the billing counter, and transmits the SOAP document, as an HTTP message, to the intermediary device 101 (Step S607).

When the intermediary device 101 receives the SOAP document from the NRS application 315, the intermediary device 101 transmits the SOAP document, as an HTTP message, to the management device 102 (Step S608).

Thus, according to the above-described communication sequence, data communication can be executed.

Next, an example of the communication sequence, which is different from the communication sequence shown in FIG. 10, in a case of transmitting data from the image processing device 100 to the management device 102 via the intermediary device 101 is described with reference to FIG. 11.

Figure 11:
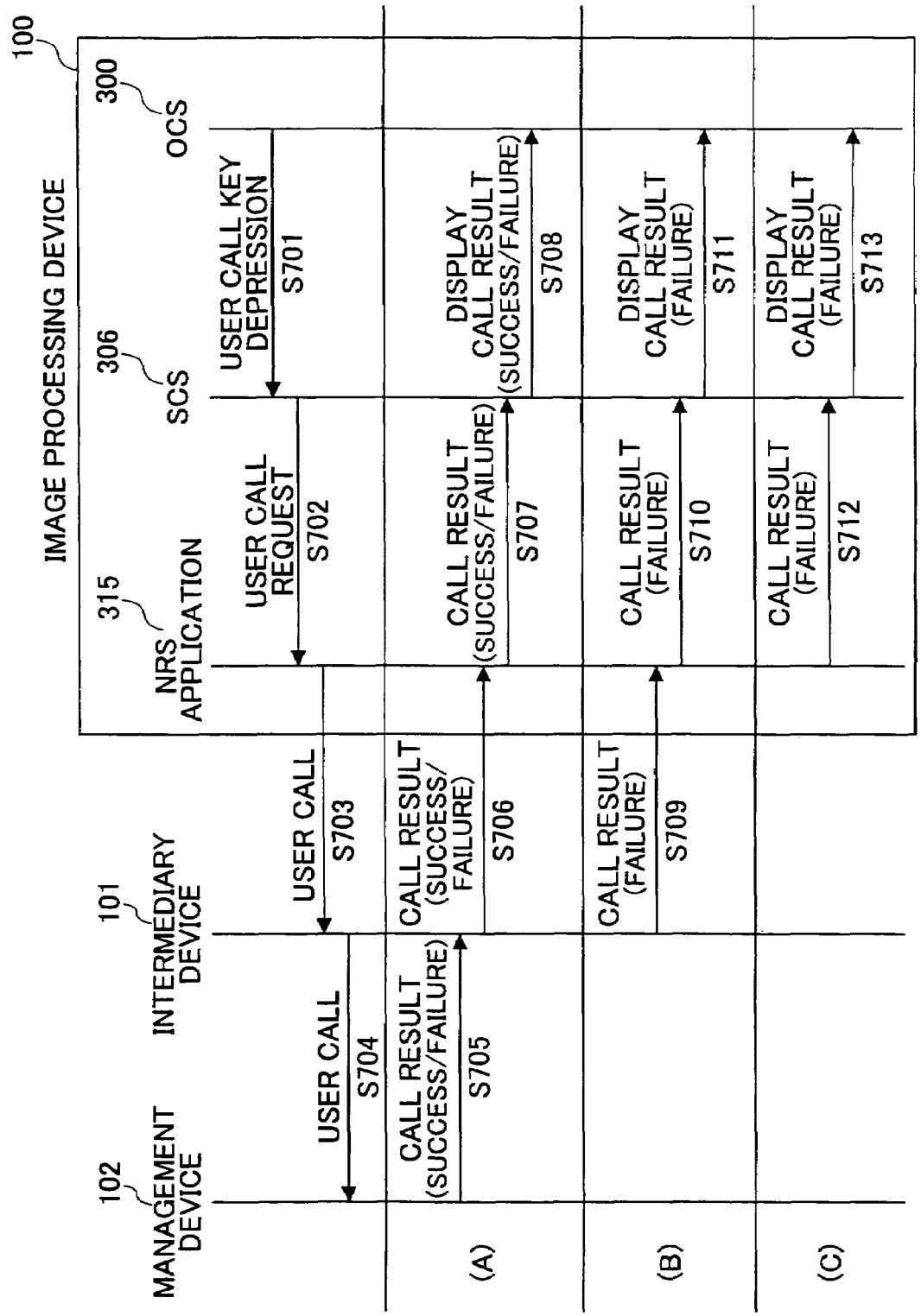
FIG. 11 is a sequence diagram showing an exemplary communication sequence when transmitting data from an image processing device to a management device shown in FIG. 3.

FIG. 11 is a diagram an example of a communication sequence in a case of transmitting data from the image processing device to the management apparatus 102.

In this example, the OCS 300 notifies to the SCS 306 that the user call key has been depressed (Step S701).

When the SCS 306 receives the notification of the depression of the user call key from the OCS 300, the SCS 306 notifies the NRS application 315 of a user call request (Step S702).

When the NRS application 315 receives the notification of the user call request from the SCS 306, the NRS application 315 generates a SOAP document indicative of user call information, and transmits the SOAP document, as an HTTP message, to the intermediary device 101 (Step S703).

When the intermediary device 101 receives the SOAP document from the NRS application 315, the intermediary device 101 adds an identifier, which includes its identification information, to the SOAP document, and transmits the SOAP document, as an HTTP message, to the management device 102, to thereby execute a user call. That is, the intermediary device 101 provides the SOAP document added with its identification information to the management device 102 (Step S704). In this case, since this transmission is directed from the inside to outside of the firewall 104, the intermediary device 101 is able to establish a session to the management device 102 and transmit data thereto.

Steps subsequent to Steps S704 are illustrated as patterns A through C in FIG. 11.

In pattern A, where the management device 102 receives a SOAP document transmitted, as an HTTP message, from the intermediary device 101 of a user, the management device 102 generates a SOAP document of a call result indicating that the user call succeeded when the reception is completed normally, and generates a SOAP document of a call result indicating that the user call failed when the reception is not completed normally (abnormal completion), and transmits the SOAP document to the intermediary device 101, as response in an HTTP message, to the intermediary device 101 of the origin (user) (Step S705).

When the intermediary device 101 receives the SOAP document indicating the call result from the management device 102, the intermediary device 101 transmits the SOAP document, as an HTTP message, to the NRS application 315 of the image processing device 100 at which the user call key was depressed (Step S706).

When the NRS application 315 receives the SOAP document indicating the call result from the intermediary device 101, the NRS application 315 interprets (judges) the call result indicated in the SOAP document, and notifies the SCS 306 of the call result (Step S707).

When the SCS 306 receives the call result, the SCS 306 delivers the call result to the OCS 300.

When the OCS 300 receives the call result from the SCS 306, the OCS 300 displays the content of the call result, that is, the message indicating whether the user call succeeded or failed, on a letter display device of the control panel 205 (Step S708).

Next, in pattern B where the intermediary device 101 determines that there is no response from the management device 102 after a prescribed time (predetermined time) has elapsed, the intermediary device 101 generates a SOAP document of a call result indicating that the user call has failed, and transmits the SOAP document, as an HTTP message, to the NRS application 315 (Step S709).

When the NRS application 315 receives the SOAP document of the call result indicating failure, the NRS application 315 interprets the call result indicating failure, and notifies the SCS 306 of the call result (Step S710).

When the SCS 306 receives the call result from the NRS application 315, the SCS 306 delivers the call result to the OCS 300.

When the OCS 300 receives the call result from the SCS 306, the OCS 300 displays the content of the call result, that is, the message indicating that the user call failed, on the letter display device of the control panel 205 (Step S711).

Next, in pattern C where the NRS application 315 determines that there is no response from the intermediary device 10 after a prescribed time has elapsed, the NRS application 315 notifies the SCS 306 of a call result, indicating that the user call has failed (Step S712).

When the SCS 306 receives the call result from the NRS application 315, the SCS 306 delivers the call result to the OCS 300.

When the OCS 300 receives the call result from the SCS 306, the OCS 300 displays the content of the call result, that is, the message indicating that the user call failed, on the letter display device of the control panel 205 (Step S713).

It is to be noted that although the above describes an example where data from the management device 102 is transmitted over the firewall 104 and to the intermediary device 101 (or to the image processing device 100 via the intermediary device 101) by transmitting data as a response to an HTTP request from the intermediary device 101, other methods (techniques) may alternatively be employed for transmitting data over the firewall 104. For example, the management device 102 may transmit mail, with data desired for transmittal being included therein or attached thereto, to the intermediary device 101 by using SMTP (Simple Mail Transfer Protocol). However, the HTTP is more preferable from the aspect of dependability.

Next, an example of a firmware update process of the image processing device 100 executed in the image processing device remote management system shown in FIG. 5 is described.

From the aspect of improving security, this example employs a method using a password list as an alternative of communication decoding. Here, the intermediary device 101 is a device corresponding to the firmware update device 91, and the image processing device 100 is a device corresponding to the target update device 92.

Numerous IDs set for the intermediary device 101 and passwords corresponding to the IDs are provided and sequenced in the password list. The password list is stored in a memory card or the like and is sent to a manager of the intermediary device 101 (one managing the intermediary device 101) and to a manager (one managing the image processing device 100) by a safe route besides the network, for example, by registered mail. The managers store the password list in a memory unit of the intermediary device 101 and the image processing device 100, respectively. When the intermediary device 101 requests certification from the image processing device 100, a foremost password among unused passwords is selected and used. Once an unused password is used, it is determined as "used", and other unused passwords are selected during the next opportunity of requesting certification (See FIG. 12).

Figure 13:
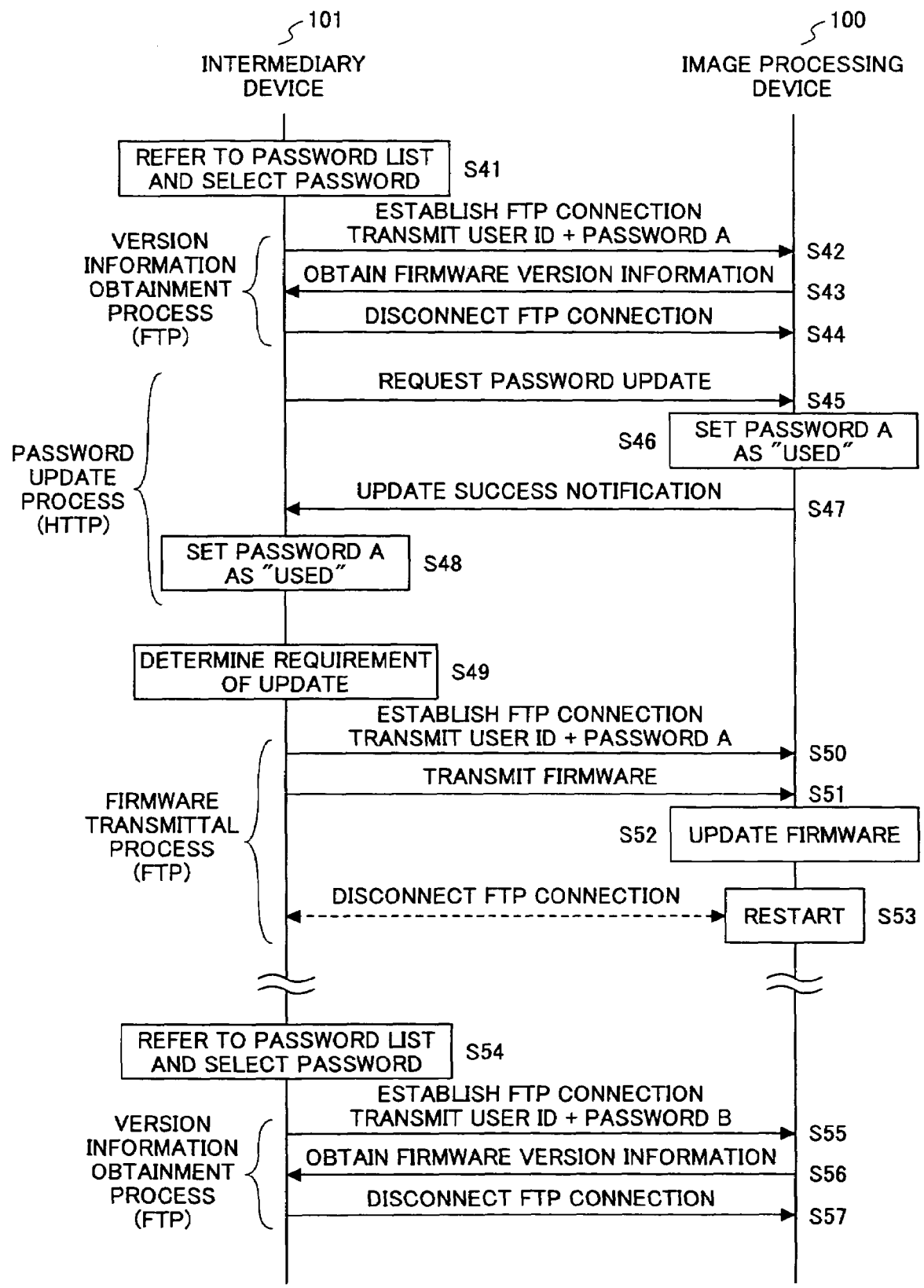
FIG. 13 is a sequence diagram showing an referential example of a firmware updating process.
Figure 26:
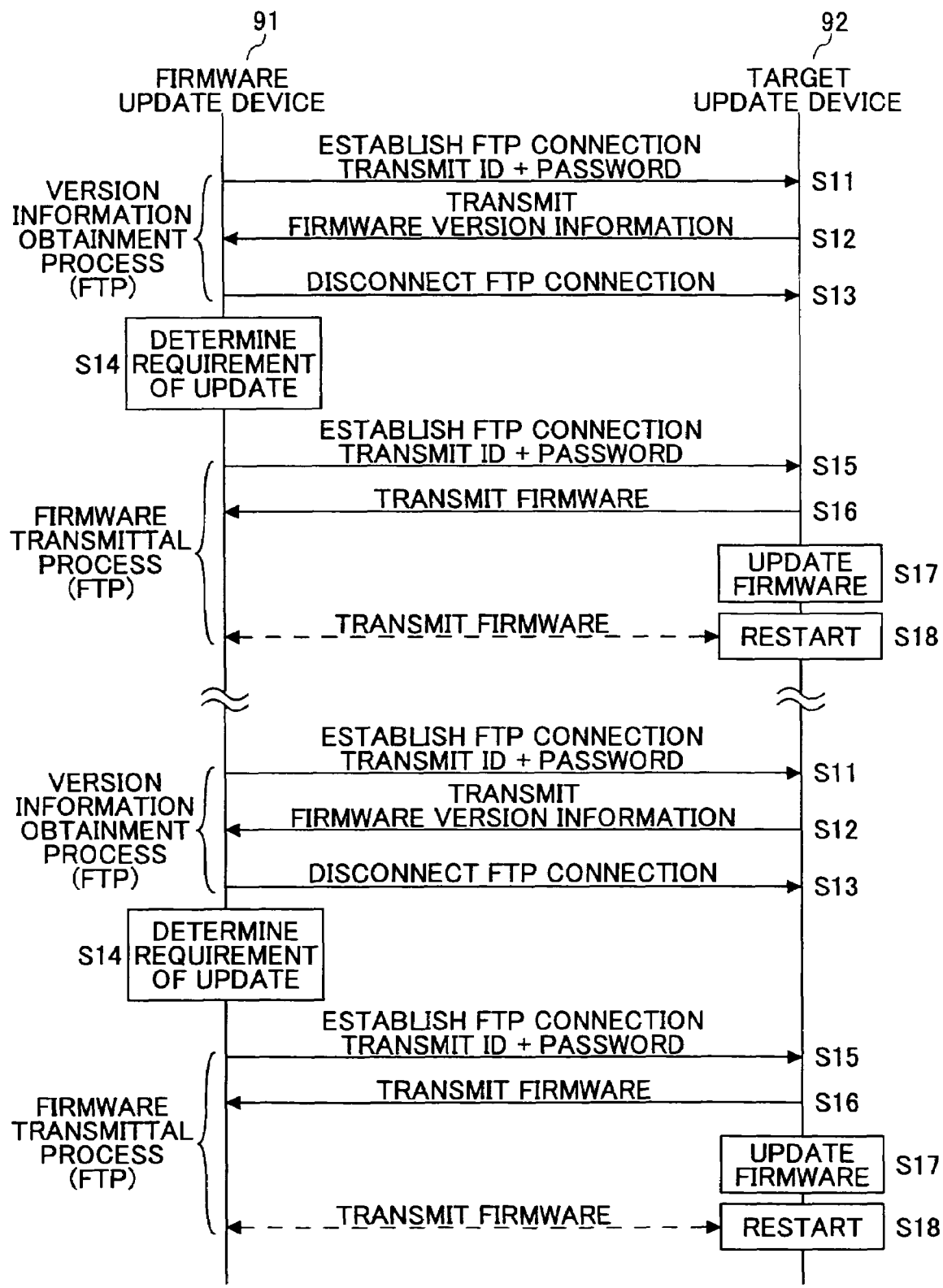
FIG. 26 is a sequence diagram showing a firmware update process example of a conventional firmware update system.
Figure 27:
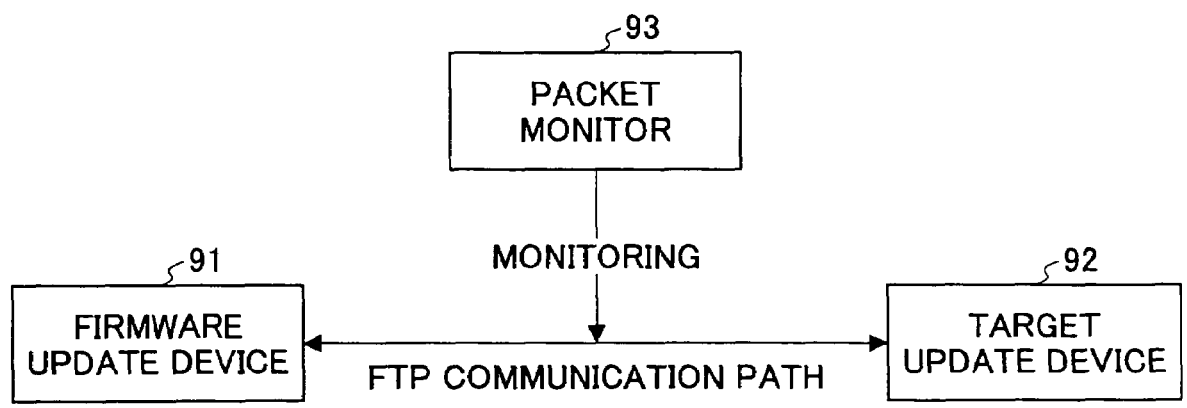
FIG. 27 is a diagram for explaining a problem of the example shown in FIG. 26.

In correspondence to FIG. 26 (this time, however, using a password list), an exemplary sequential firmware update process is shown in FIG. 13.

In the exemplary process shown in FIG. 13, the intermediary device 101 and the image processing device 100 communicate by using FTP (File Transfer Protocol).

Similar to the process shown in FIG. 26, the intermediary device 101 transmits an ID and a password to the image processing device 100 for requesting an FTP connection when, for example, a prescribed event occurs. However, before requesting the FTP connection, the intermediary device 101 selects a password to be used by referring to a password list (Step S41). In this case, since no password has been used yet, a foremost password A is selected (See FIG. 12).

Then, the intermediary device 101 performs the version information obtainment process in a manner similar to that of the process shown in FIG. 26 (Steps S11 through S13), to thereby obtain version information of the firmware of the image processing device 100 (Step S42 through S44). In this version information obtainment process, however, the password that is used is password A. The image processing device 100, having the same password list stored therein, compares the foremost password A by referring to said stored password list, to thereby execute a certification process.

After the version obtainment process is finished, the intermediary device 101 begins a password update process in which the intermediary device 101 transmits a password update request, using HTTP (Hyper Text Transfer Protocol), to the image processing device 100 (Step S45). Then, among the passwords in the password list, the image processing device 100, in accordance with the request, determines (sets) the used password (password A) as "used" (Step S46). When this determination is successful, an update success notification is returned (Step S47) to the intermediary device 101.

When the intermediary device 101 receives the notification, the intermediary device 101, in a manner similar to that of the image processing device 100, determines (sets) the used password (password A) as "used" (Step S48), thereby completing the password update process. The completion of the password update process enables a subsequent safe and unused password (password B) to be used since the once transferred password (password A) is already determined to be "used" by both the intermediary device 101 and the image processing device 100. However, in a case where a firmware transmittal process is to be performed thereafter, the password used in the version information obtainment process (password A) remains to be used until the firmware transmittal process is finished.

Next, the intermediary device 101 determines whether firmware update is required based on the version information of the firmware obtained in Step S43. When update is determined to be unnecessary, the process is finished, and when update is determined to be required, the version obtainment process is performed. When the intermediary device 101 determines that firmware update is required, the following firmware transmittal process (Steps S50 through S53) is performed. The process is more or less the same as that of the firmware transmittal process shown in FIG. 26, except for the fact that the password used in the certification process is password A included in the password list.

Accordingly, the image processing device 100 is able to update firmware when necessary. Furthermore, whenever the version information obtainment process or the firmware transmittal process is to be performed again, a password is, again, selected by referring to the password list (Step S54). In this case, however, since the password A is already "used", a subsequent password (password B) is selected.

Then, in Steps S55 through S57, the version information obtainment process is performed in a same manner described in Steps S42 through S44. In this case, however, password B is used as the password for the certification process.

The above-described processes are repeated while sequentially changing the passwords, for example, password C, D . . . .

By using the password list in the above-described manner, a password shall not be used after the firmware update process once a password is transferred by FTP, thereby allowing the certification process to be performed with a secure password. Accordingly, fraudulent access (e.g. spoofing) can be prevented, and security can be improved.

Nevertheless, this example employing the password list uses a large amount of data since the password list includes numerous passwords, and results to an increase in cost for preparing a memory capable of storing the data. Since the passwords are stored in the respective devices, a third person may fraudulently access the device and steal the whole password list which includes the passwords. Furthermore, since the above-described example requires the password list to be delivered to the manager by, for example, registered mail, and it requires the labor of manually storing the password list into the device by the manager. Furthermore, in a case where an error in the process occurs in which the passwords between the devices do not match, the certification process cannot be performed. Furthermore, with the above-described example, either a new list is required to be distributed and stored or passwords having been already used are required to be used again when all of the passwords in the password list have been used since the number of passwords in the password list is limited.

Meanwhile, in the image processing device remote management system shown in FIG. 5, the intermediary device 101 and the image processing device 100 may, when necessary, communicate after certification using SSL has been performed. Therefore, a communication procedure with the SSL certification, particularly the certification process part, is next described. As types of the certification, there are mutual certification where both are able to certify each other, and one-way certification where only one can certify the other. First, an example employing mutual certification is described below.

Figure 14:
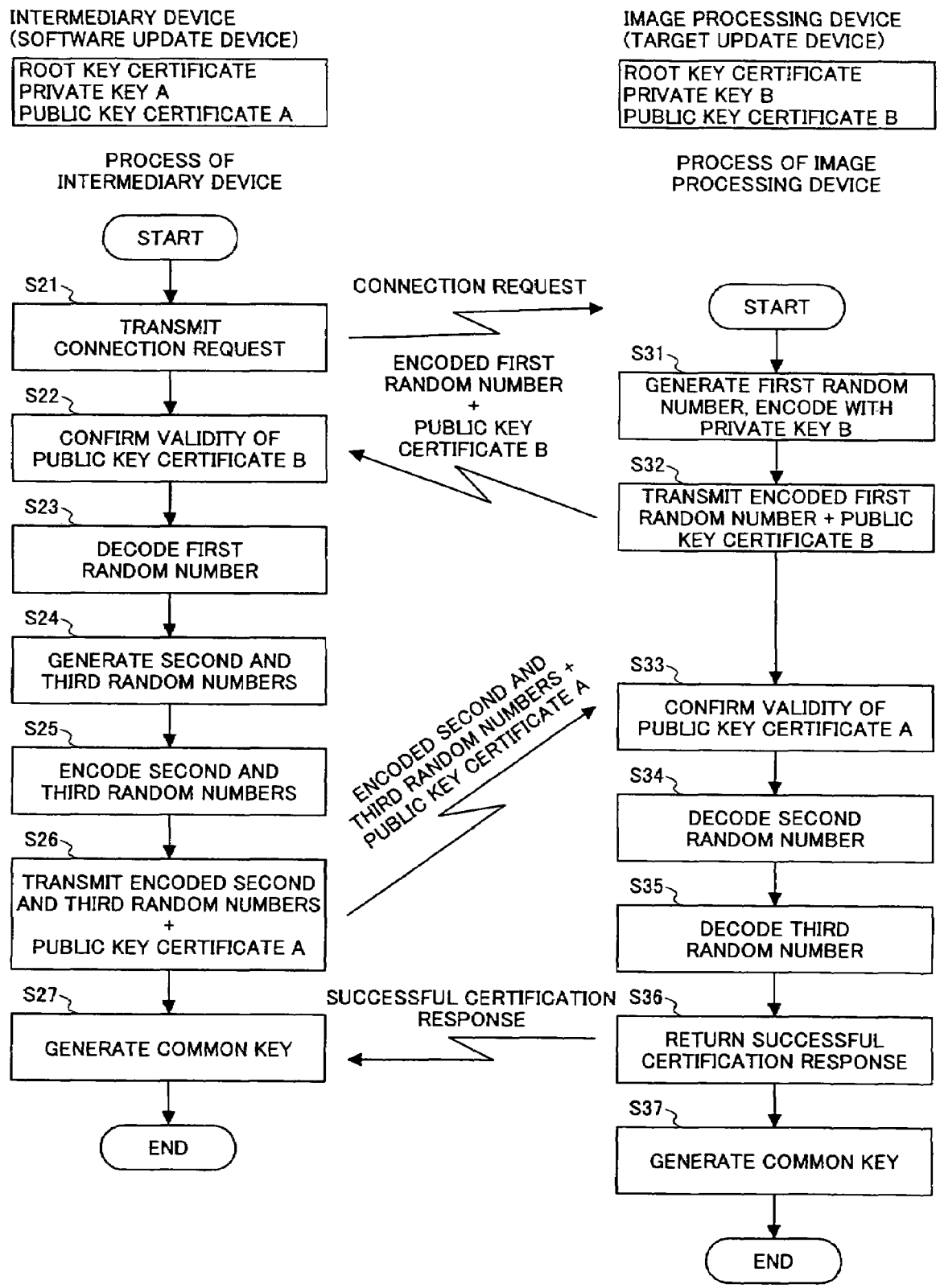
FIG. 14 is a sequence diagram showing a process example during mutual certification using SSL between an intermediary device and an image processing device shown in FIG. 3.

FIG. 14 shows flowcharts of the processes performed by respective devices where mutual certification with SSL is performed by the intermediary device 101 and the image processing device 100, and also shows the information that is handled in the processes.

As shown in FIG. 14, a root key certificate, a private key A, and a public key certificate A are required to be stored in the intermediary device 101. The private key A is a private key issued to the intermediary device 101 by a certificate authority (CA). The public key certificate A is a digital certificate in which a public key corresponding to the private key A is provided with a digital signature by the CA. The root key certificate is a digital certificate in which a root key for confirming the validity of the digital signature of the CA is provided with a digital signature. It is to be noted that the public key comprises a key main body for decoding decoded documents using a corresponding private key, and bibliography information including, for example, information on the issuer of the public key (CA), the issue-recipient, and/or the expiration date.

On the other hand, a root key certificate, a private key B, and a public key certificate B are required to be stored in the image processing device 100. The private key B is a private key issued for the image processing device 100 by the CA, and the public key certificate B is a public key certificate issued for the image processing device 100 by the CA. Here, the same CA issues certificates for the intermediary device 101 and the image processing device 100 using the same root key, and the intermediary device 101 and the image processing device 100 have a common root key certificate.

The arrows illustrated between the two flow charts in FIG. 14 serve to indicate transfer (transmission and reception) of data. The step proximal to the root of the arrow is where a transmittal process is performed, and the step that is pointed to by the tip of the arrow is where a prescribed process is performed upon reception of data. In a step where a prescribed process is not completed normally, at that point, a response indicating certification failure is returned and the prescribed process is discontinued. This also applies to a case of receiving a certification failure response from an opponent, or a case of time out for a prescribed process. Each of the processes are performed in accordance with prescribed control programs of the CPU provided to the intermediary device 101 and the image processing device 100.

In a case where the intermediary device 101 requests connection to the image processing device 100, the process shown in the flowchart on the left side of FIG. 14 is initiated. In Step S21, the intermediary device 101 transmits a connection request to the image processing device.

The image processing device 100, on the other hand, initiates the process shown in the flowchart on the right side of FIG. 14 upon receiving the connection request. Then, in Step S31, a first random number is generated, and is encoded using the private key B. In Step S32, the encoded first random number and the public key certificate B are transmitted to the intermediary device 101.

In Step S22, the intermediary device 101, upon receiving the encoded first random number and the public key certificate B, confirms validity of the public key certificate B using the root key certificate. This process of confirming validity includes a process of confirming that the image processing device 100 is the appropriate communication opponent by referring to the bibliography information included in the public key.

In Step S23, when validity is confirmed, the first random number is decoded using the public key B including in the public key certificate B. Here, when decoding is successful, it can be confirmed that the first random number has been transmitted from the image processing device 100 which is the issue target of the public key certificate B. Accordingly, the image processing device 100 can be certified as the appropriate communication opponent.

Next, in Step S24, second and third random numbers, separate from the first random number, are generated. In Step S25, the second random number is encoded using the private key A, and the third random number is encoded using the public key B. In Step S26, the second and third random numbers along with the public key certificate A are transmitted to the image processing device 100. The encoding of the third random number is performed for preventing the random number from being known by devices other than the image processing device 100.

In Step S33, the image processing device 100, upon receiving the second and third random numbers along with the public key certificate A, confirms validity of the public key certificate A by using the root key certificate. In the same manner as Step S22, the process of confirming the validity of the public key certificate A includes a process of confirming that the intermediary device 101 is the appropriate communication opponent. In Step S34, when validity is confirmed, the second random number is decoded by using the public key A included in the received public key certificate A. Here, when decoding is successful, it can be confirmed that the second random number has been transmitted from the intermediary device 101 which is the issue target of the public key certificate A. Accordingly, the intermediary device 101 can be certified as the appropriate communication opponent.

Next, in Step S35, the third random number is decoded by using the private key B. With the foregoing processes, first through third random numbers are commonly shared on the server side and the client side. The third random number, at least, cannot be known except by the intermediary device 101 which generated the third random number, and the image processing device 100 which has the private key B. In Step S36, a successful certification response is returned to the intermediary device 101 when the foregoing processes (steps) have succeeded.

In Step S27, the intermediary device 101, after receiving the response, generates a common key from the first through third random numbers for future use in communication encoding. Then, the certification process of the intermediary device 101 is finished.

In Step S37, the image processing device 100, after returning the response, also generates a common key from the first through third random numbers for future use in communication encoding. Then, the certification process of the image processing device 100 is finished.

Accordingly, communication between the intermediary device 101 and the image processing device 100 can be established, thereby the common keys generated in Steps S27 and S37 can be used thereafter, and communication with common key encryption can be performed.

By employing the mutual certification with SSL for communication, the intermediary device 101 and the image processing device 100 can safely exchange common keys by certifying each other, and achieve communication with a definite opponent.

In the description hereafter, when either one of the devices requests connection with SSL, the mutual certification process shown in FIG. 14 is executed, and connection is established when the certification is successful. The example of FIG. 14, however, only shows a case where the intermediary device 101 requests communication to the image processing device 100. Therefore, in a case where the image processing device 100 requests communication to the intermediary device 101, the image processing device 100 executes the processes corresponding to those executed by the intermediary device 101 in the example shown in FIG. 14, and the intermediary device 101 executes the processes corresponding to those executed by the image processing device 100 in the example shown in FIG. 14.

Figure 15:
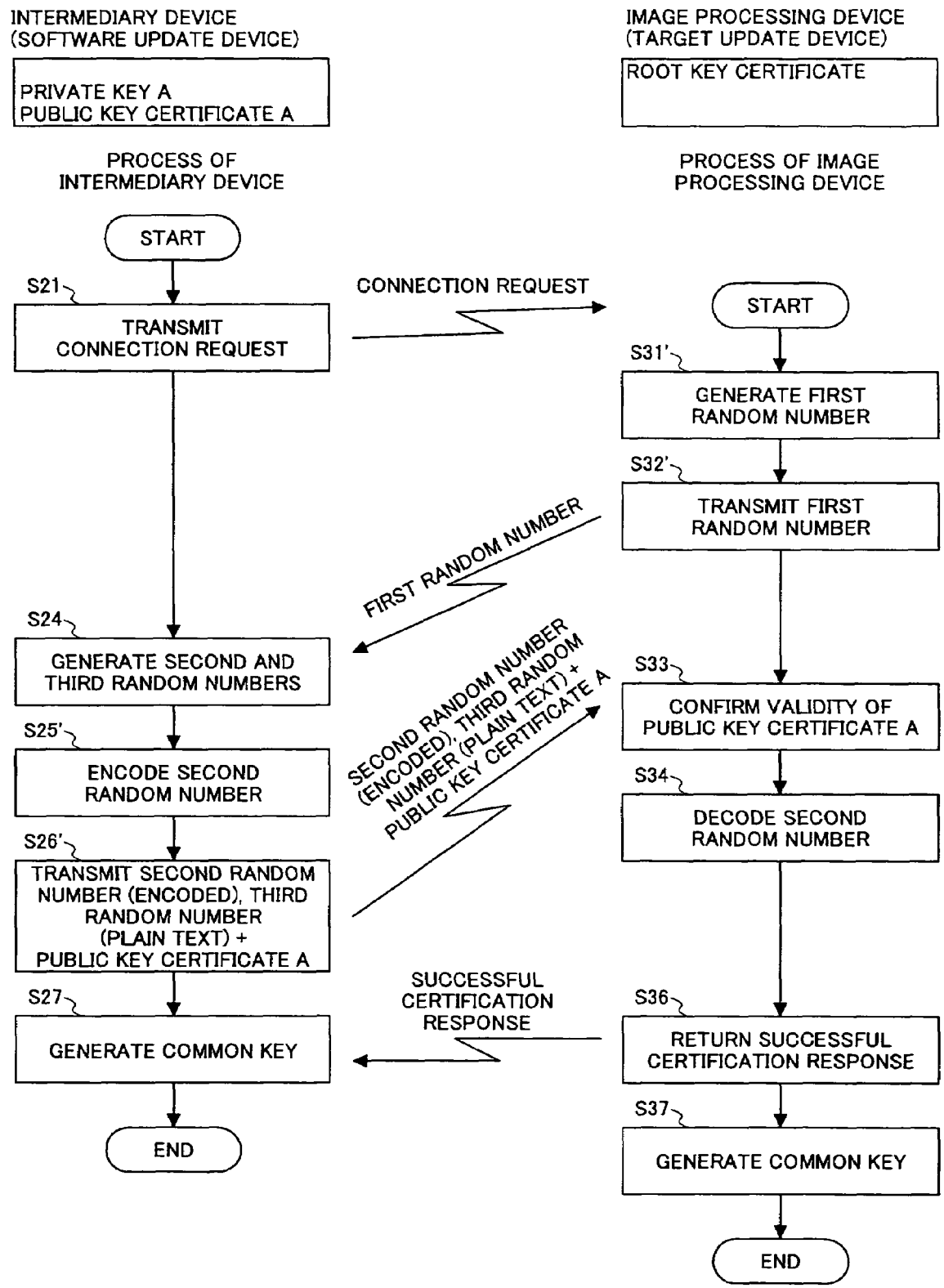
FIG. 15 is a sequence diagram showing a process example of one-way certification.

It is to be noted that in a case of one-way certification, for example, a case where only the image processing device 100 certifies the intermediary device 101, the steps of encoding first through third random numbers in the certification process shown in FIG. 14 can be omitted. In this case, the root key certificate is required to be stored only in the image processing device 100. In such case, the certification process can be simplified as in a manner shown in FIG. 15. That is, the Steps S22 and S23 of the intermediary device 100 will not be required, and also the Step S35 of the image processing device 100 will not be required.

Figure 16:
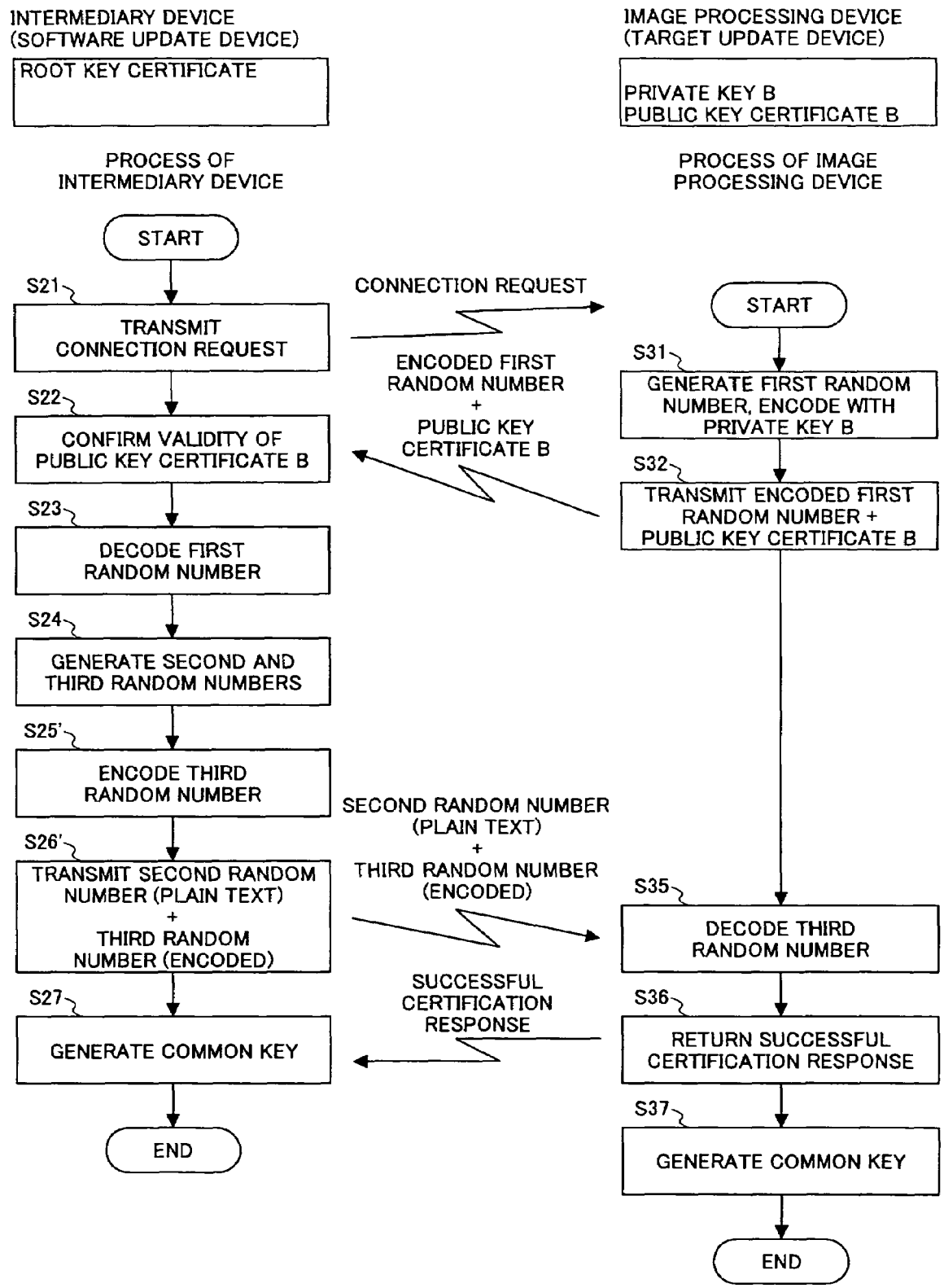
FIG. 16 is another sequence diagram showing another process example.

On the other hand, in a case where only the intermediary device 101 certifies the image processing device 100, the step of encoding the second random number can be omitted. In this case, the root key certificate is required to be stored only in the intermediary device 101. In such case, the certification process can be simplified as in a manner shown in FIG. 16. That is, the Steps S23 and S24 of the intermediary device 100 will not be required.

Figure 17:
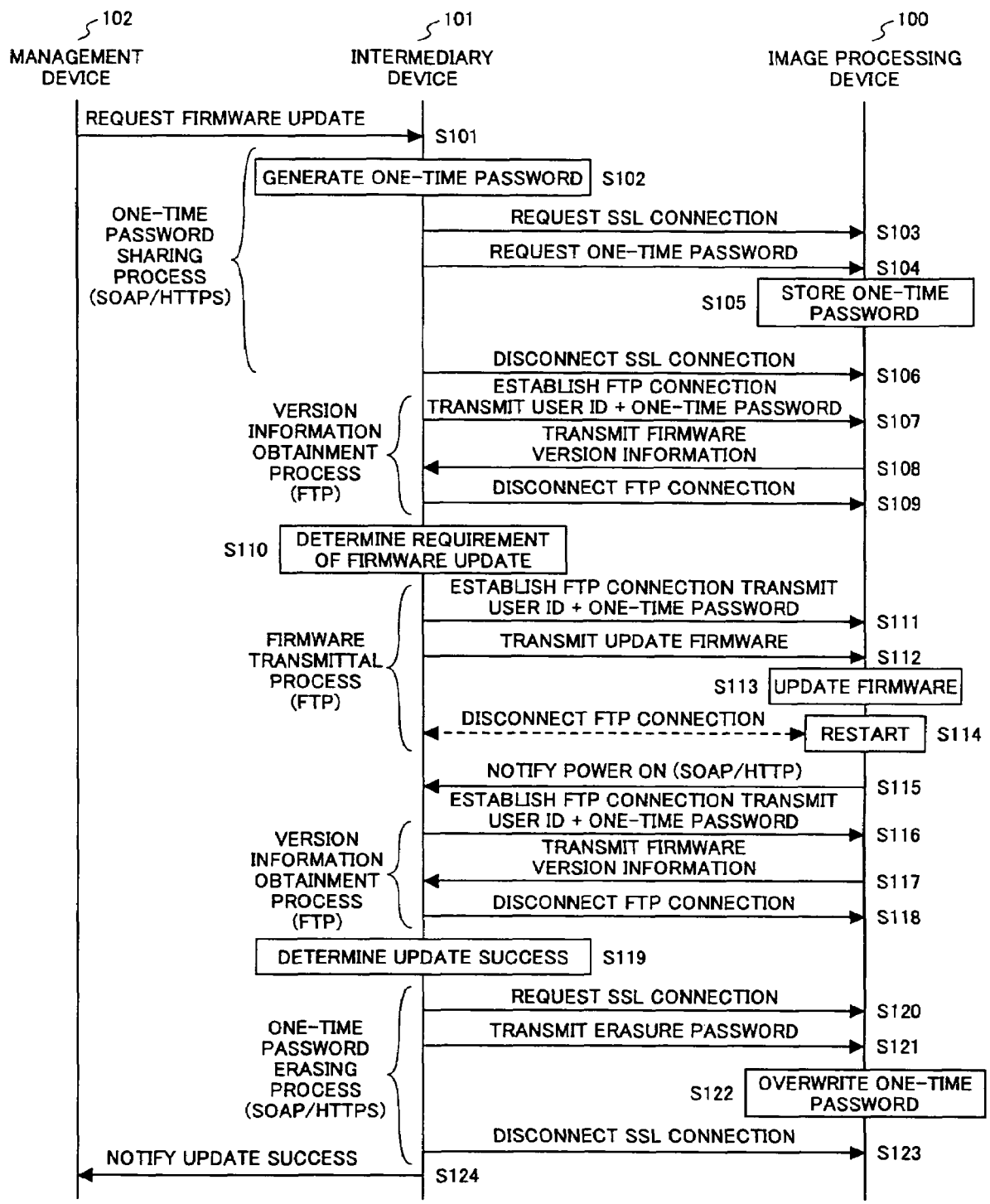
FIG. 17 is a sequence diagram showing a process example during update of firmware of an image processing device using an intermediary device shown in FIG. 3.

Next, the firmware update process of the image processing device 100 in the image processing device remote management system 2000 in FIG. 5 is described. This process is shown in FIG. 17, in which the process is performed by allowing each CPU of the management device 102, the intermediary device 101, and the image processing device 100 to execute a respective prescribed control programs. It is to be noted that the intermediary device 101 functions as the software update device according to an embodiment of the present invention, and the image processing device 100 serves as the communication device which is the target update device. With these devices, the software update system according to an embodiment of the present invention can be obtained. Further, the management device 102 corresponds to an external device requesting firmware update to the software update system.

It is to be noted that prior to performing the processes shown in FIG. 17, firmware for updating is required to be stored in the intermediary device 101 beforehand. The storing of the firmware may be performed, for example, by transferring the firmware from the management device 102 or another device, or by reading out the firmware recorded in a recording medium.

In the image processing device remote management system shown in FIG. 5, the management device 102 transmits a firmware update request to the intermediary device 101 when a prescribed event occurs (e.g. when a prescribed period has elapsed or when there is a command from an operator of the management device 102) (Step S101). Although not shown, the transmission may be performed as a response to the polling from the intermediary device 101 as described in FIG. 10.

When the intermediary device 101 receives the request, the intermediary device 101 initiates a firmware update process for the image processing device 100, first by, performing a one-time password sharing process.

In the Step S102, the intermediary device 101 generates a one-time password as update certification information, to be used in a certification process during firmware updating, by using, for example, random numbers, and stores the one-time password therein. Then, the intermediary device 101 requests an SSL connection to the image processing device 100 (Step S103). When the connection is established, the intermediary device 101 transmits the one-time password to the image processing device 100, and requests the image processing device 100 to store the one-time password (Step S104). The request may be performed as an RPC with SOAP.

The image processing device 100, in accordance with the request, stores the received one-time password in a memory unit (Step S105). The one-time password is to be used as a password corresponding to an ID of the intermediary device 101 in a certification process during the following FTP connection. Since certification is completed during the request of SSL connection, the one-time password, here, is not used in a certification process. Although not shown in the diagram, the image processing device 100 returns a response to the intermediary device 101 for informing that storage of the one-time password is completed, and the intermediary device 101 disconnects the SSL connection when receiving the response from the image processing device 100 (Step S106). The communications in Steps S103 through S106 are performed using HTTPS.

The one-time password sharing process is completed by performing the above-described steps. In this process, the CPU 52 of the intermediary device 101 function as a certification information setting unit. Furthermore, by performing this process, the intermediary device 101 and the image processing device 100 are able to safely share the one-time password by using an encoded communication path. The communication path using SSL is a first communication path. It is to be noted that the "communication path" is defined by the protocol used for communication (communication method) rather than the physical transmission path. Therefore, in a case where the physical transmission path is the same, the communication path would be different if the communication protocol is different. In a case where the physical transmission path changes according to circumstance, such as the Internet, the communication path can be determined when the device for communication and the protocol for communication are defined.

After the one-time password sharing process is completed, the intermediary device 101 performs a version information obtainment process.

Although this version information obtainment process is more or less similar to that shown in FIG. 26 (Steps S11 through S13), the password transmitted from the intermediary device 101 to the image processing device 100 for requesting FTP connection (Step S107) is the same one-time password transmitted in Step S104. The image processing device 100 performs a certification process using the one-time password stored in Step S105. If the one-time passwords match, certification is a success, and the FTP connection is established (Step S107). If the one-time passwords do not match, no FTP connection is established, thereby resulting in discontinuation of the process (error). In this version information obtainment process, the CPU 52 of the intermediary device 101 functions as a certification requesting unit, and the CPU of the image processing device 100 functions as a certifying unit.

When the FTP connection is established, the image processing device 100, in accordance with the request from the intermediary device 101, transmits firmware version information to the intermediary device 101 (Step S108). After the intermediary device 101 obtains the firmware version information, the intermediary device 101 disconnects the connection with the image processing device 100 (Step S109). The version information obtainment process is completed by performing the above-described steps.

Besides the fact that the one-time password is used, the following Step S110 and the firmware transmittal process are more or less similar to that shown in FIG. 26 (Steps S14 through S18).

That is, the intermediary device 101 determines whether update is required based on the firmware version information obtained in Step S108, and if it is determined that update is required (S110), the subsequent firmware transmittal process is executed. If it is determined that no update is required, a notification informing that no update is required may be sent to the management device 102 as a response to the firmware update request.

In the firmware transmittal process, the intermediary device 101 transmits an ID and the one-time password to the image processing device 100 in a same manner performed in Step S107. If the certification process performed by the image processing device 100 is a success, the FTP connection is established (Step S111). Then, the intermediary device 101 transmits the firmware for update (update firmware) to the image processing device 100 (Step S112). In this step, the CPU 52 of the intermediary device 101 functions as a transmitting unit.

When the image processing device 100 receives the update firmware, the image processing device 100 updates its' own firmware to the received update firmware (Step S113). In this step, the CPU of the image processing device 100 functions as an updating unit. When the updating is completed, the image processing device 100 resets itself and restarts to validate the new updated firmware (Step S114). The FTP connection is disconnected by the resetting of the image processing device 100. The firmware transmittal process is completed by performing the above-described steps.

The FTP communication path used in the firmware transmittal process is a second communication path. Since no procedure of decoding the communication content is performed in using FTP, the processing load is considerably lower than that of the first communication path using SSL.

The image processing device 100, after the completion of the restarting, a power ON notification reporting the start may be transmitted as a start notification to the intermediary device 101 (Step S115). This allows the intermediary device 101 to know that the firmware update of the image processing device 100 has been completed, and determine, at a suitable timing, whether the update has succeeded. The power ON notification may be described as a SOAP document, and may be transmitted using HTTP.

After the intermediary device 101 receives the power ON notification, a version information obtainment process is performed in a same manner as Steps S107 through S109, in which an FTP connection with the image processing device 100 is established, and firmware version information is obtained from the image processing device 100 (Steps S116 through S118). Then, if the obtained version information matches with the update firmware transmitted in Step S112, it is determined that the firmware update was a success (Step S119), thereby advancing to the following one-time password erasing process.

If the obtained version information does not match with the update firmware, it is determined that the firmware update is a failure. Accordingly, either the firmware transmittal process may be performed again, or a notification informing the failure of the firmware update may be sent to the management device 102 as a response to the firmware update request.

It is, however, to be noted that in a case where the update is determined as a failure, the password erasing process may be performed when it is confirmed that SSL communication (communication with a path allowing safe transmission of the one-time password) with the image processing device 100 is possible.

In the one-time password erasing process, the intermediary device 101 requests SSL connection to the image processing device 100 in the same manner as in the one-time password sharing process (S120). After the SSl connection is established, the intermediary device 101 transmits a password for erasure (erasure password) to the image processing device 100, and requests the image processing device 100 to store the erasure password (Step S121). This request is, in other words, a request for invalidating the one-time password. In this step, the CPU 52 of the intermediary device 101 functions as a certification information invalidation unit. It is to be noted that the erasure password may be a random password generated each time of transmittal, or may be a fixed password. A password that has not been transmitted by FTP and that will not in the future be transmitted by FTP may be used as the erasure password. Furthermore, in requesting erasure, the intermediary device 101 may erase its' own one-time password stored therein.

Although a request requesting erasure of the stored one-time password may be used as the request for invalidating the one-time password, a request requesting storage of another password (overwriting) may, alternatively, be used as the request for invalidating the one-time password. By using the overwriting request, a process common to the one-time password sharing process can be employed, so that the program can be made compact, and improve development efficiency.

The image processing device 100, in accordance with the request, overwrites the one-time password with the received erasure password (Step S122), so that the one-time password stored in Step S105 may no longer be used in the certification process during FTP connection. Since certification is completed during the request for SSL connection, the erasure password is not used for certification in this step. After the storing (overwriting) is completed, the intermediary device 101 disconnects the SSL connection (Step S123). The one-time password erasing process is completed by performing the above-described steps. Accordingly, the one-time password stored in the image processing device 100 can be invalidated.

After completion of the one-time password erasing process, the intermediary device 101 notifies of the management device 102 success of the update as a response to the firmware update request (Step S124).

By performing the above-described processes, a software update device is able to update the firmware for a target update device capable of communicating via a network.

Figure 18:
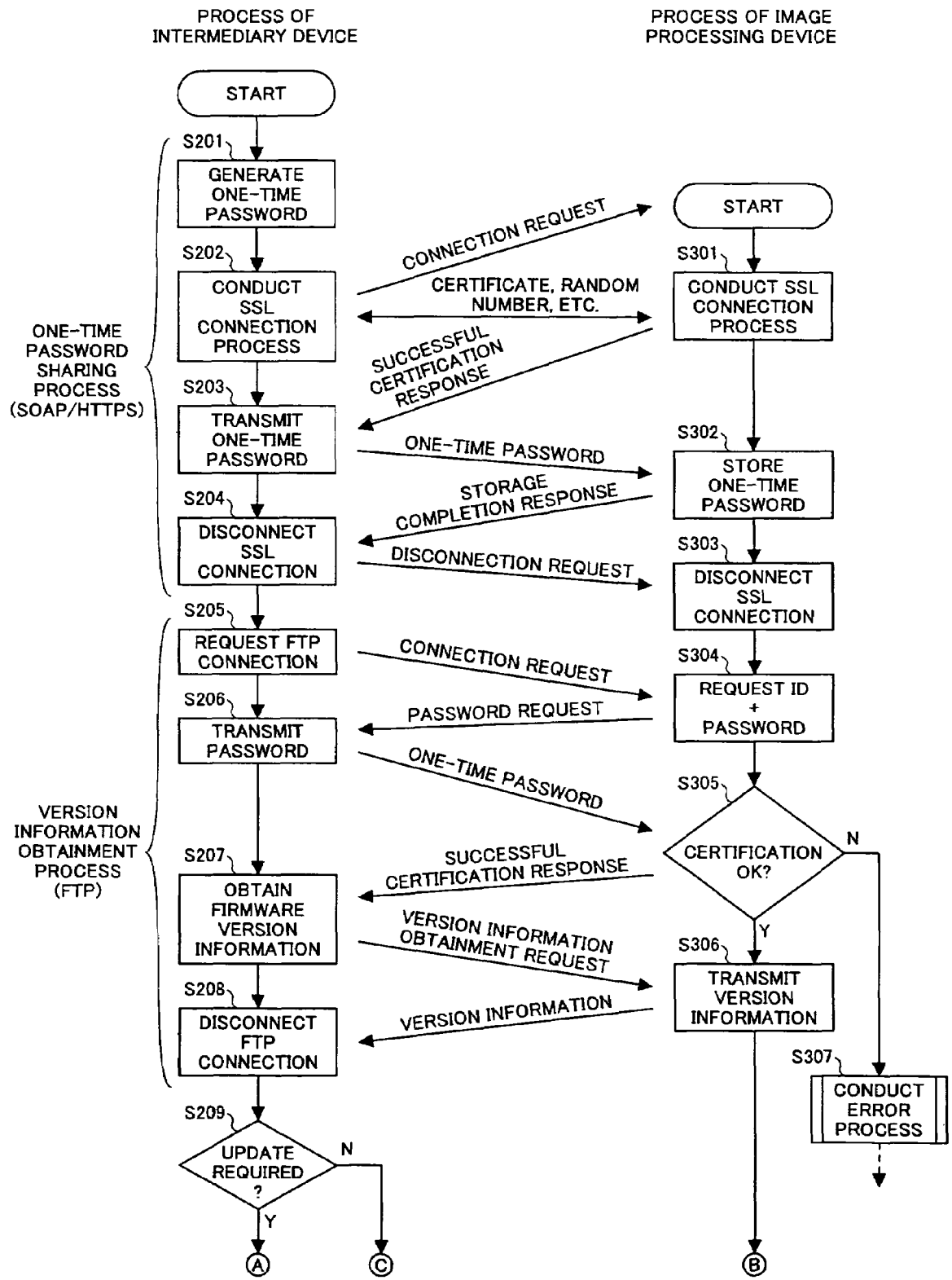
FIG. 18 is a flowchart showing a part of a process example during update of firmware of an image processing device using an intermediary device shown in FIG. 3.
Figure 19:
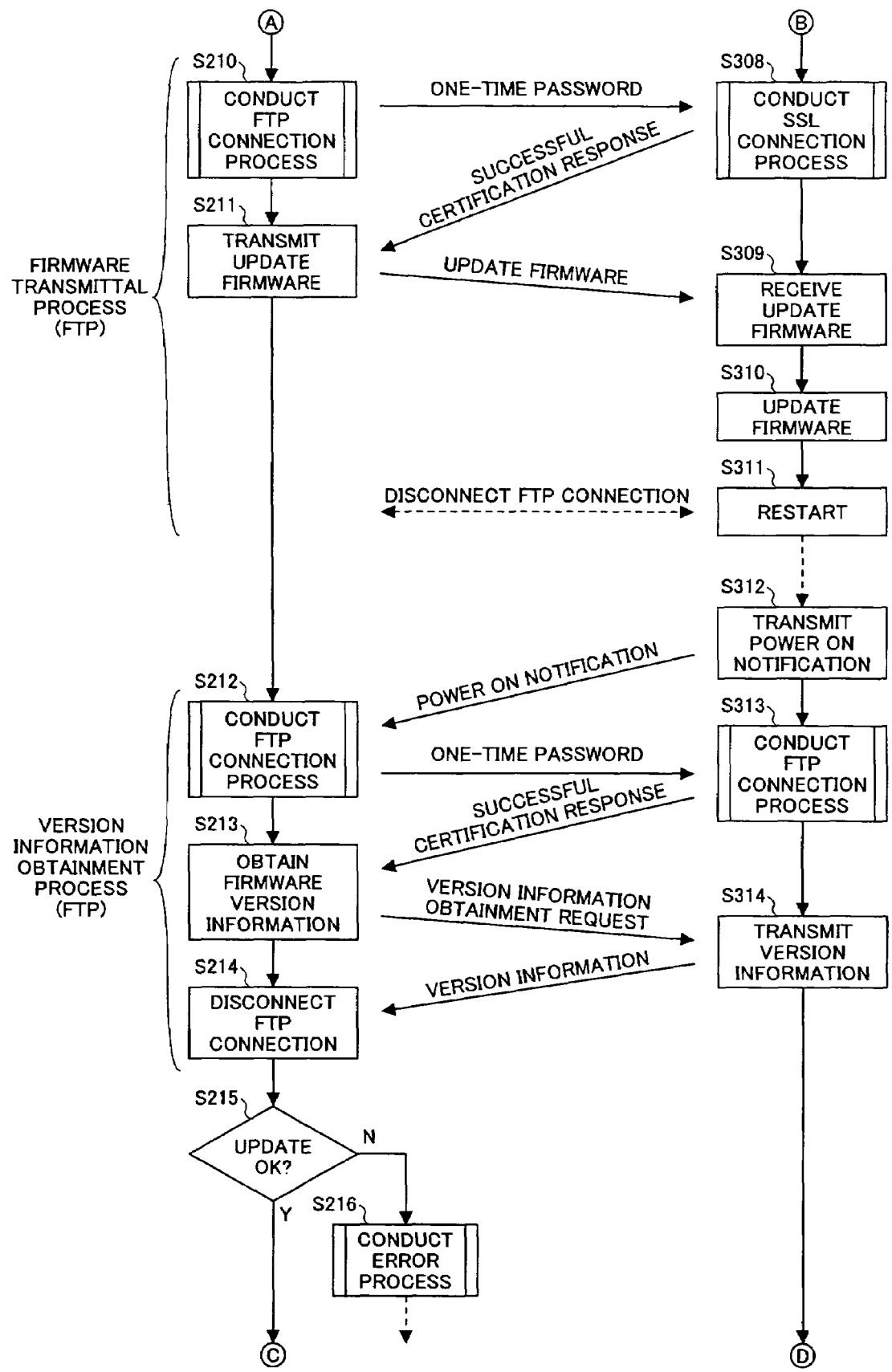
FIG. 19 is a continuation of the flowchart shown in FIG. 18.
Figure 20:
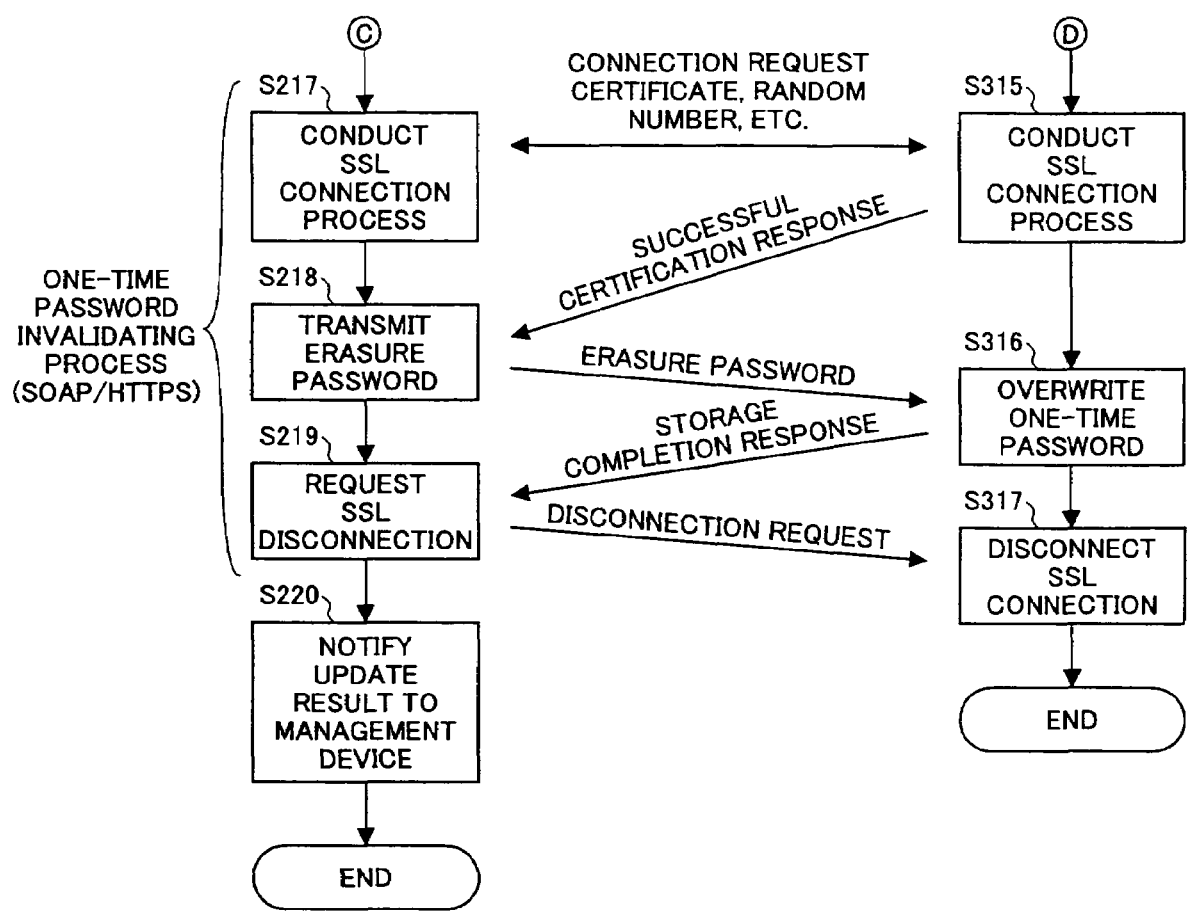
FIG. 20 is a continuation of the flowchart shown in FIG. 19.

Flow charts of the above-described processes are illustrated in FIGS. 18 through 20 for supplementary explanation of the above-described processes. The arrows illustrated between the two flow charts in the drawings serve to indicate transfer (transmission and reception) of data. The step proximal to the root of the arrow is where a transmittal process is performed, and the step that is pointed by the tip of the arrow is where a prescribed process is performed upon reception of data.

In FIG. 18, when the intermediary device 101 receives a firmware update request from the management device 102, the intermediary device 101 starts the processes illustrated by the flowchart on the left side of FIG. 18. In Step S201, the intermediary device 101 generates the one-time password and stores the one-time password therein. In Step S202, the intermediary device 101 requests SSL connection to the image processing device 100.

When the image processing device 100 receives the request, the image processing device 100 starts the processes illustrated by the flowchart on the right side of FIG. 18. In Step S301, the image processing device 100 performs an SSL connection process with the intermediary device 101. The process performed by the intermediary device 101 in Step S202 and the image processing device 100 in Step S301 is the mutual certification process shown in FIG. 14.

When the certification is successful, the image processing device 100 returns the successful certification response as described in Step S36 of FIG. 14. Then, in Step S203, the intermediary device 101 transmits the one-time password, generated in Step S201, to the image processing device 100, and requests the image processing device 100 to store the one-time password. In Step S302, when the image processing device 100 receives the request, the image processing device 100 stores the one-time password, and returns a response informing that storage is completed. In Step S204, when the intermediary device 101 receives the response, the intermediary device 101 sends a disconnection request to the image processing device 100, and disconnects the SSL connection. The image processing device 100 having received the disconnection request also disconnects the SSL connection. The one-time password sharing process is completed by performing the above-described steps.

Next, in Step S205, the intermediary device 101 requests FTP connection to the image processing device 100. Then, in Step S304, the image processing device 100 requests an ID and a password for certification. In Step S206, the intermediary device 101, in response to the request, transmits the ID and the one-time password generated in Step S201 to the image processing device 100.

In Step S305, the image processing device 100 performs a certification process with the ID and the password. If these match with those stored therein, the image processing device 100 returns a response informing the intermediary device 101 of success of certification. In Step S207, the intermediary device 101, having received the response, transmits a version information obtainment request to the image processing device 100 for obtaining firmware version information. In Step S306, the image processing device 100, in response to the request, transmits version information to the intermediary device 101. In Step S208, after the intermediary device 101 obtains the version information, the intermediary device 101 disconnects the FTP connection. The version information obtainment process is completed by performing the above-described steps.

In Step S305, when the certification process ends in failure, the image processing device 100 conducts an error process in Step S307. The error process may be, for example, informing certification failure to the intermediary device 101, and waiting for connection to be requested again. Although not shown in the diagrams, the same process may also be performed in a case where, for example, the mutual certification using SSL ends in failure (e.g. Step S301).

Subsequent to Step S208, the intermediary device 101, in Step S209, determines whether update of the firmware of the image processing device 100 is required based on whether the version information obtained in Step S207 corresponds to the newest (latest) version. The intermediary device 101 advances to a firmware transmittal process (FIG. 19) when it is determined that update is required.

In this case, the intermediary device 101, in Step S210, performs processes in the same manner described in Steps S205 and S206, and the image processing device 100, in Step S308, performs processes in the same manner as described in Steps S304 and S305, to thereby establish FTP connection. The password used in this firmware transmittal process is the same one-time password used in Step S206.

When the FTP connection is established, the intermediary device 101, in Step S211, transmits firmware for update (update firmware) to the image processing device 100. After the image processing device 100 receives the update firmware in Step S309, the image processing device 100, in Step S310, updates its' firmware to the update firmware. In this step, in a case where, for example, another job is being performed, or another job is being reserved, the updating process may wait until such jobs are completed. In Step S311, the image processing device 100 resets and restarts itself for validating the new firmware. Furthermore, the FTP connection is disconnected by the resetting of the image processing device 100. The firmware transmittal process is completed by performing the above-described steps.

Next, after the completion of the restart of the image processing device 100, the image processing device 100, in Step S312, transmits a Power ON notification informing that the image processing device 100 has been restarted. In Step S212, the intermediary device 100, in response to the notification, requests FTP connection to the image processing device 100. In Steps 212 through 214, the intermediary device 101 obtains firmware version information by performing processes same as those of Steps S205 through S208. In Steps S313 and S314, the image processing device 100 transmits version information of firmware by performing processes same as those of Steps S304 through S307.

In Step S215, the intermediary device 101 compares the version information obtained in Step S213 and the update firmware version information transmitted in Step S211, and proceeds to the one-time password erasing (invalidating) process in a case where the compared version information items match, which results in a determination that the update is a success. In a case where there is no match between the compared version information items, it is determined that the update is a failure, thereby proceeding to the error process in Step S216. In this error process, the firmware transmittal process in Step S210 may be tried again, or a response informing the management device 102 of update failure may be returned as a response to the firmware update request. For the latter case, the above-described processes are finished, and remain until a next firmware update request is transmitted.

In Step S215, when it is determined that the update is a success (OK), the process advances to the one-time password invalidating (erasing) process shown in FIG. 20. Here, the mutual certification is performed in which the intermediary device 101, in Step S217, conducts the SSL connection process with respect to the image processing device 100 in a manner the same as Step S202 while the image processing device 100, in Step S315, also conducts the SSL connection process. In Step S218, when the intermediary device 101 receives a successful certification response from the image processing device 100, the intermediary device 101 transmits the erasure password to the image processing device 100, and requests the image processing device 100 to store the erasure password. In Step S316, when the image processing device 100 receives the request, the image processing device 100 stores the erasure password by overwriting the one-time password with the erasure password, and returns a storage completion response to the intermediary device 101 when the erasure password has been stored. In Step S219, when the intermediary device 101 receives the storage completion response, the intermediary device 101 sends a disconnection request to the image processing device 100 for disconnecting the SSL connection. In Step S317, the image processing device 100, having received the disconnection request, also disconnects the SSL connection. The one-time password invalidating process is completed by performing the above-described steps.

It is to be noted that, as described above, other methods besides the overwriting method may alternatively be employed for erasing the stored one-time password.

This password invalidating process is more or less the same as the one-time password sharing process except for the fact that the erasure password is not necessarily required to be generated each time. With this process, an already used one-time password, which has a risk of being leaked out, can be invalidated by changing the password for the FTP certification process into a different password, and spoofing by a third person can be prevented. Furthermore, by transferring the erasure password, not with FTP, but with a safe communication path using, for example, SSL will prevent the erasure password from leaking out.

After the one-time password invalidating process, the intermediary device 101, in Step S220, notifies the management device 102 of the firmware update result.

It is to be noted that, when it is determined that update is not required in Step S209, the process advances to the one-time password invalidating process (Steps S217 through S219), and is finished after the result is provided to the management device 202. Furthermore, the image processing device 100 does not perform the processes illustrated in FIG. 19 unless there is a request of Step S210 or Step S212 since the image processing device 100 is basically triggered by the intermediary device 101.

Accordingly, by performing the above-described processes where the firmware of the target update device capable of communicating via a network is updated with a software update device according to an embodiment of the present invention, an updating process can be performed with a compact program while maintaining high security. The object for updating is not restricted to firmware, but other software may also be subjected to updating.

That is, since FTP, requiring a small processing load, may be used in a version information obtainment process or a software transmittal process of a software updating process, a compact updating program can be obtained. Since software itself has less confidentiality compared to certification information (e.g. password) or user information of the target management device, etc., the software may be transmitted by a communication path requiring no encodings such as FTP. It is, in fact, preferable to reduce processing load as much as possible and obtain a compact-sized program. Furthermore, since software has a larger size compared to certification information (e.g. passwords), processing load can be considerably reduced by transmitting the software through a communication path with little processing load.

Meanwhile, in order to prevent reception of fraudulent software, certification of the communication opponent is important. The password used in the FTP certification process is generated immediately before usage, and is shared by the intermediary device 101 and the image processing device 100 by using SSL. Therefore, the password may be prevented from leaking to a third person. Furthermore, a case where a third person transmits fraudulent software and executes an updating process by pretending (spoofing) to be the intermediary device 101 can be prevented.

Furthermore, even in a case where a third person monitors the FTP communication and fraudulently obtains the one-time password, connection with the one-time password cannot be achieved and fraudulent access can be prevented by invalidating the password used for the FTP certification immediately after confirming the success of the software update process.

Furthermore, after the software has been updated, the intermediary device 101 can easily recognize a requirement for updating software by allowing software version information to be confirmed upon restarting of the image processing device 100. This enables actions (e.g. attempting update once again) to be taken promptly in a case where updating has failed. The update can be confirmed at a suitable timing by allowing the image processing device 100 to transmit a power ON notification to the intermediary device 101 upon restart.

Furthermore, by enabling the intermediary device 101, in accordance with a request from the outside (external), to cause the image processing device 100 to update its software, and return a response on the result of the update, the management device 102, for example, will be able to manage the software updating state of each of the image processing devices 100.

Since firmware, in general, includes software that serves to execute the basic controls of hardware, there is a risk that the hardware (device) will become completely inoperative when update of the firmware ends in failure in a case where the firmware is provided with a self-updating function. In order to prevent such situation, a separate updating program for executing an updating process may be prepared for enabling firmware except for the part of the updating program to be updated. However, this updating program, which is not used during regular operations, consumes large memory capacity and is relatively costly. Accordingly, there is a demand for an updating program requiring little memory capacity. For satisfying such demand, the above-described updating process employs a compact program using, for example, FTP, for updating software (firmware), to thereby reduce the memory requirement of the updating program.

As described above, in case the updating of firmware ends in failure, the target update device may have a firmware updating program that is provided separately from the firmware itself. In this process, by not invalidating the one-time password in a case where the firmware updating process fails, the version information obtainment process can be performed again without using SSL, thereby, the updating program of the image processing device 100 requires only a program for executing the version information obtainment process and the firmware transmittal process. Accordingly, while security can be enhanced by using SSL for transferring passwords, parts necessary for this process are not required to be included in the updating program, thereby providing a compact-sized updating program.

It is to be noted that a common process can be employed for the one-time password sharing process and the one-time password invalidating (erasing) process by using a method of overwriting the one-time password with the erasure password for invalidating (erasing) the one-time password, thereby providing a compact-sized program.

As an alternative for overwriting the one-time password with the erasure password, a request prohibiting the use of the one-time password in the certification process may be made so that the image processing device 100, in response to the request, is set to not perform the certification process with the one-time password. This request requires no secrecy and does not need to be transmitted with SSL. Considering the risk of the erasure password being stolen from the image processing device, it is preferable to conduct such setting.

MODIFIED EXAMPLE

Next, modified examples of the present invention are described.

In the aforementioned embodiments of the present invention, the intermediary device 101 starts the firmware update process when receiving the firmware update request from the management device 102, in which, the intermediary device 101, in this exemplary case, generates the one-time password. However, the firmware updating process of the present invention is not limited to the aforementioned embodiments.

Figure 21:
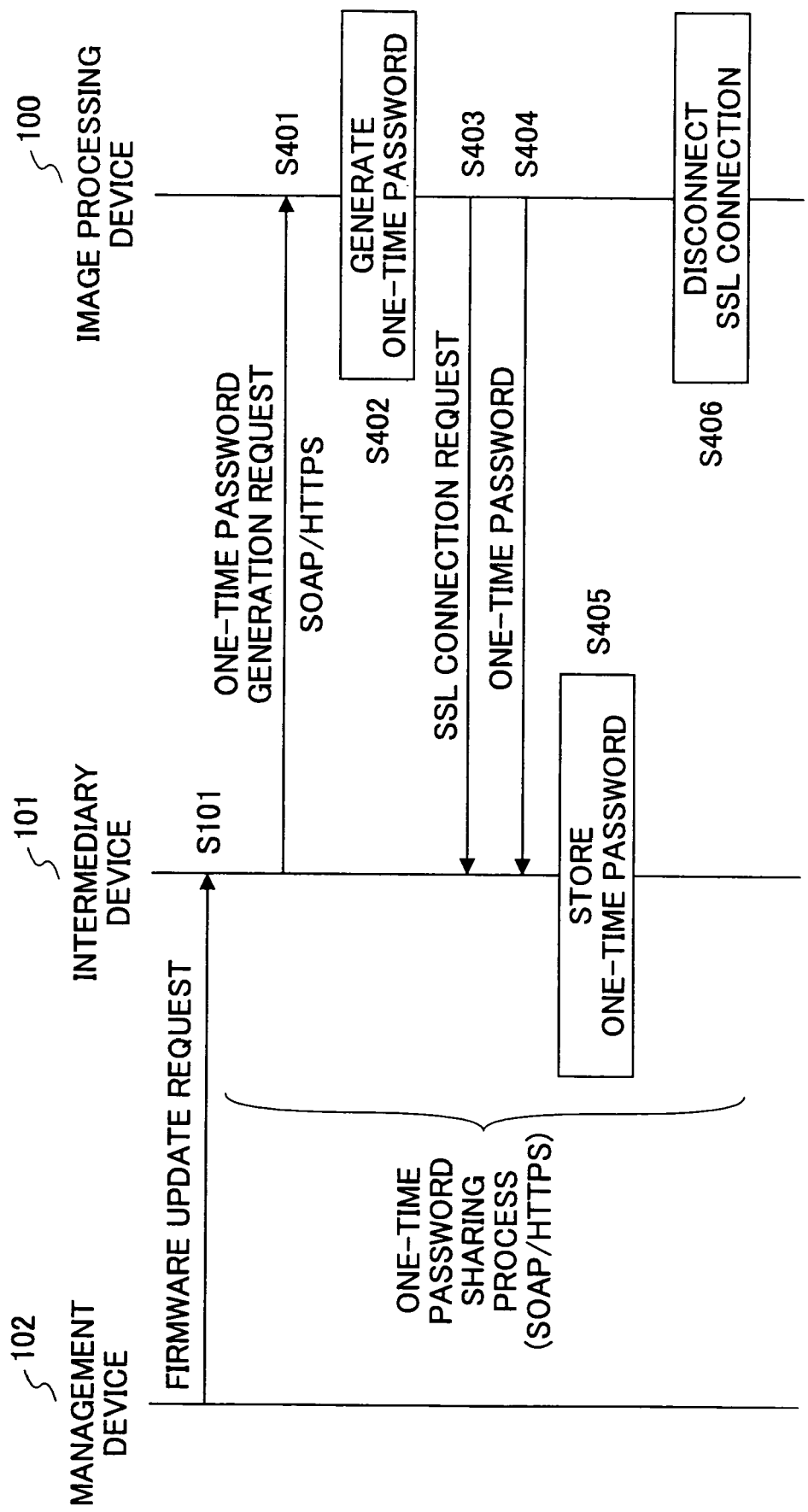
FIG. 21 is a sequence diagram showing a process example of a first modified example of the process shown in FIG. 17.

In a first modified example, the generation of the one-time password can be performed by the image processing device 100. In this case, the processes shown in FIG. 21 are alternatively used with respect to the processes (Steps S102 through S106) shown in FIG. 17.

That is, when the intermediary device 101 receives the firmware update request in Step S101, the firmware update process for the image processing device 100 is initiated. First, the intermediary device 101 transmits a one-time password generation request to the image processing device 100 (Step S401). Since no secrecy is required for this request, the request may be sent with HTTP as a SOAP document.

Then, the image processing device 100 generates a one-time password, and stores the generated one-time password (Step S402). The one-time password is, thereafter, to be used in a certification process during FTP connection for comparing with the ID of the intermediary device 101 that has transmitted the one-time password generation request.

Then, the image processing device 100 conducts SSL connection with the intermediary device 101 (Step S403). When the SSL connection is established, the image processing device 100 transmits the one-time password to the intermediary device 101, and requests the intermediary device 101 to store the one-time password (Step S404). This request is transmitted as an RPC of SOAP.

The intermediary device 101, in response to the request, stores the one-time password in a memory unit (S405). Although not shown, the intermediary device 101 returns a response informing the completion of the storage to the image processing device 100. When the image processing device 100 receives the response, the image processing device 100 disconnects the SSL connection (Step S406). The communications in Steps S403 through S406 are performed using HTTPS.

In the processes of Steps S402 through S406, the CPU of the image processing device 100 functions as a certification information setting unit.

In the same manner as in the processes shown in FIG. 17, the intermediary device 101 and the image processing device 100 in this example are also able to safely share the one-time password through a decoded communication path. Therefore, the advantages obtained by performing the processes shown in FIG. 17 can be attained also for this example.

Figure 22:
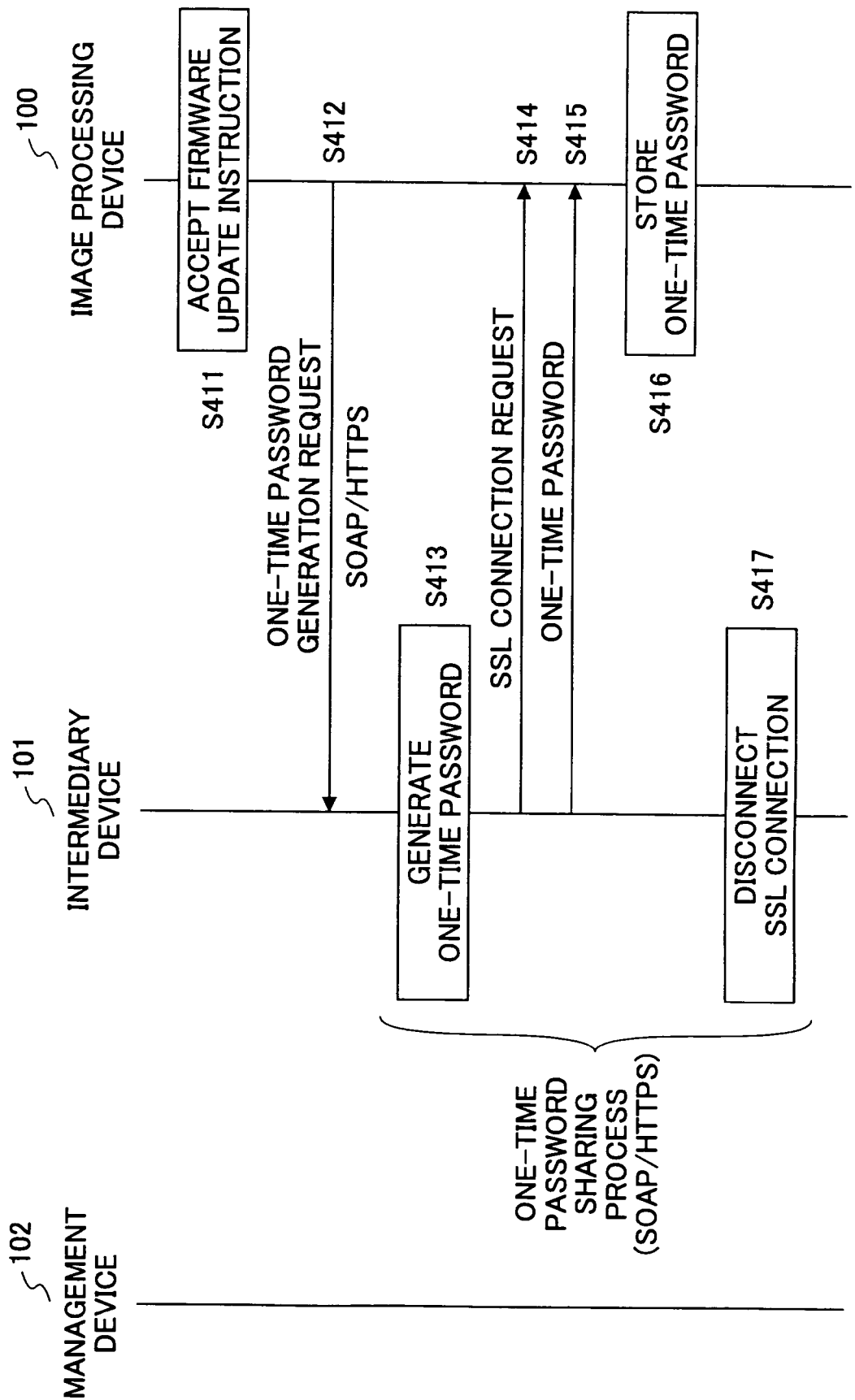
FIG. 22 is a sequence diagram showing a process example of a second modified example of the process shown in FIG. 17.

As a second modified example, the image processing device 100 may accept firmware update instructions directly from, for example, the control panel 205. In this case, the processes shown in FIG. 22 are alternatively used with respect to the processes (Steps S102 through S106) shown in FIG. 17.

That is, when the image processing device 100 accepts a firmware update instruction in Step S411, the firmware update process for the image processing device 100 is initiated. First, the image processing device 100 transmits a one-time password generation request to the intermediary device 101 (Step S412). When the intermediary device 101 receives this request, the intermediary device performs the one-time password sharing process in a manner the same as when receiving the firmware update request from the management device 102 shown in FIG. 17. That is, the Steps S413 through S417 shown in FIG. 22 correspond to the Steps S102 through S106 shown in FIG. 17.

Therefore, in a case where the image processing device 100 directly accepts a firmware update request, the firmware of the image processing device 100 can be updated in a manner the same as a case where the intermediary device 101 receives a firmware update request from the management device 102.

Although no firmware update request is transmitted from the management device 102 in this modified example, it may be preferable to provide update success as in Step S124 of FIG. 17 if the management device 102 can be identified. If this is possible, the management device 102 is able to recognize the update of firmware that has been directed by a device other than the management device 102, thereby ensuring suitable management.

It is also possible to perform the firmware update process for the image processing device 100 (one-time password sharing process and the processes performed thereafter) in a case where the intermediary device 101 accepts a firmware update instruction from a control part connecting to an Op-Port 56.

In a third modified example, the above-described first and second modified examples are combined. That is, the image processing device 100 directly accepts a firmware update instruction and also generates a one-time password.

Figure 23:
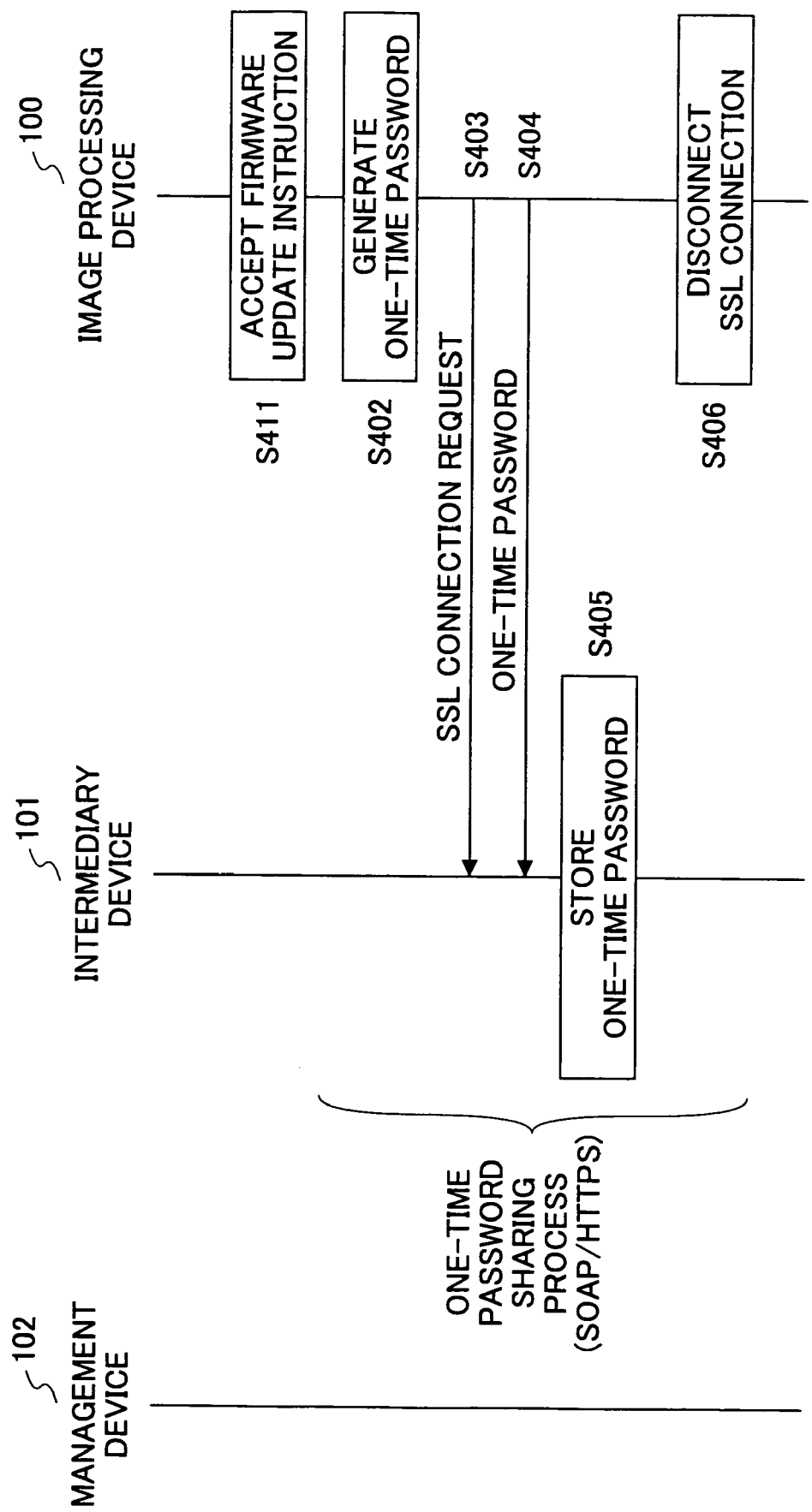
FIG. 23 is a sequence diagram showing a process example of a third modified example of the process shown in FIG. 17.

In this case, the processes shown in FIG. 23 are alternatively used with respect to the processes (Steps S102 through S106) shown in FIG. 17.

Since Step S411 shown in FIG. 23 is the same as that shown in FIG. 22, and Steps S402 through S406 shown in FIG. 23 are the same as those shown in FIG. 21, further description thereof is omitted. In this example, the intermediary device 101 acknowledges that the firmware update process for the image processing device 100 is initiated upon receiving a request for storing the one-time password, and performs prescribed processes thereafter.

A combination of the advantages of the first and second modified examples can be attained for the third modified example.

Figure 24:
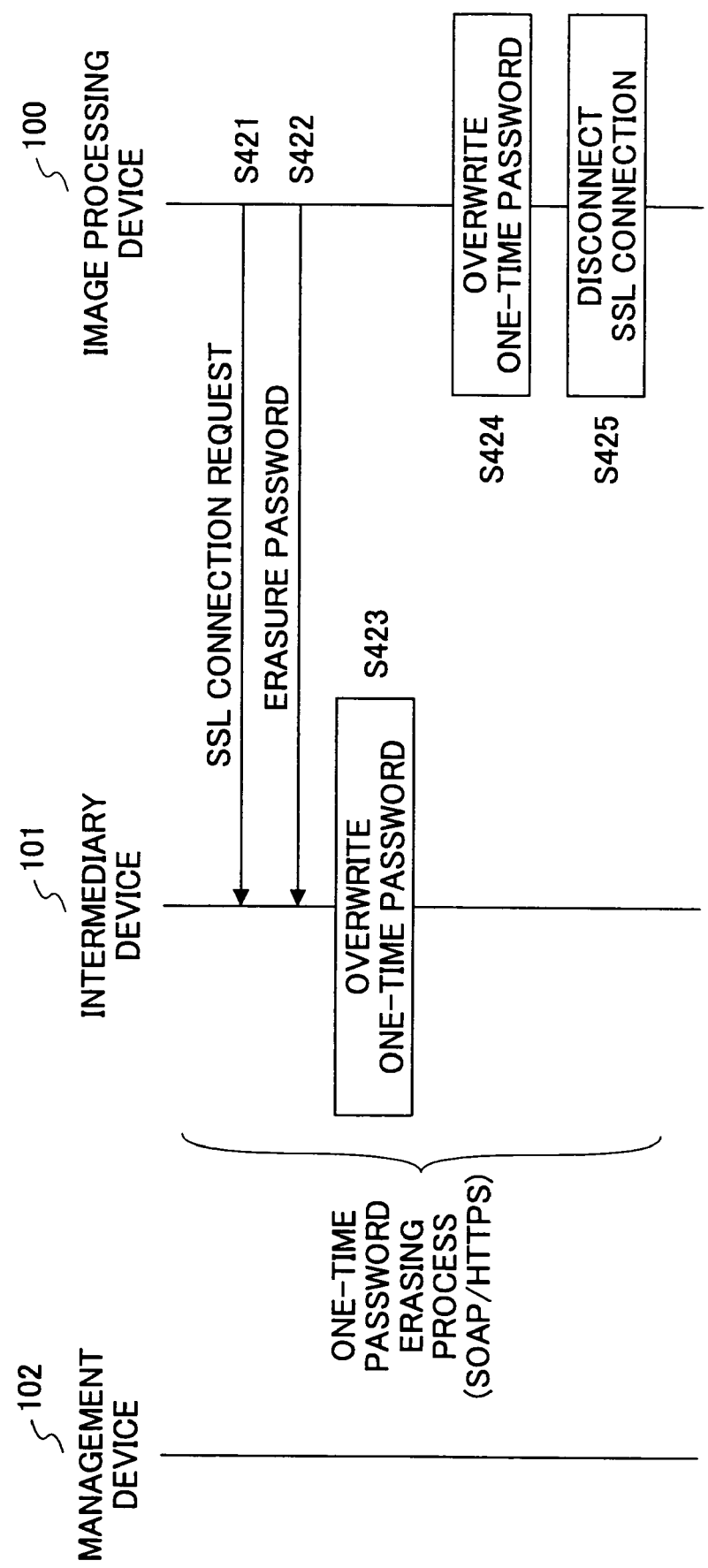
FIG. 24 is a sequence diagram showing a process example of a fourth modified example of the process shown in FIG. 17.

In a fourth modified example, the request for storing the erasure password in the one-time password erasing process can be transmitted from the image processing device 100. In this case, the processes shown in FIG. 24 are alternatively used with respect to the processes (Steps S120 through S123) shown in FIG. 17.

That is, the image processing device 100, in a manner the same as Step S412 of FIG. 22, conducts the SSL connection process with respect to the intermediary device 101 (Step S421). When the SSL connection is established, the image processing device 100 transmits an erasure password to the intermediary device 101, and requests the intermediary device to store the erasure password (Step S422). This request is a request for invalidating the one-time password. In this one-time password erasing process, the CPU of the image processing device 100 functions as a certification information invalidating unit.

The intermediary device 101, in response to the request, overwrites the one-time password with the received erasure password (Step S423), to thereby prevent the stored one-time password from being transmitted during FTP connection. Meanwhile, the image processing device 100 also overwrites the stored one-time password with the erasure password (Step S424), to thereby prohibit the stored one-time password to be transmitted during FTP connection. After completion of the storing (overwriting) process, the image processing device 100 disconnects SSL connection (Step S425).

Although this modified example may be applied to the above-described embodiments and modified examples, it is particularly effective to apply this modified example to a case where the generation of the one-time password is performed by the image processing device 100 (first and third modified examples), since the password transmittal process using SSL can be uniformly conducted from the image processing device 100.

It is to be noted that the intermediary device 101, in applying this example, may preferably notify the image processing device 100 of successful update when the update is a success in Step S119 in FIG. 17, so that the image processing device 100, in response to the notification, may initiate the processes shown in FIG. 24.

It is also to be noted that although an image processing device having a communication function is used as an example of a communication device (a target update device) in the above embodiments and modified examples, various electronic devices having a communication function may alternatively be employed, for example, a network household electric appliance, a vending machine, a medical appliance, an electric power device, an air conditioning system, a metering system for gas, water, or electricity, a multipurpose computer connectable to a network, an automobile, or an aircraft which have a communication function.

Figure 25:
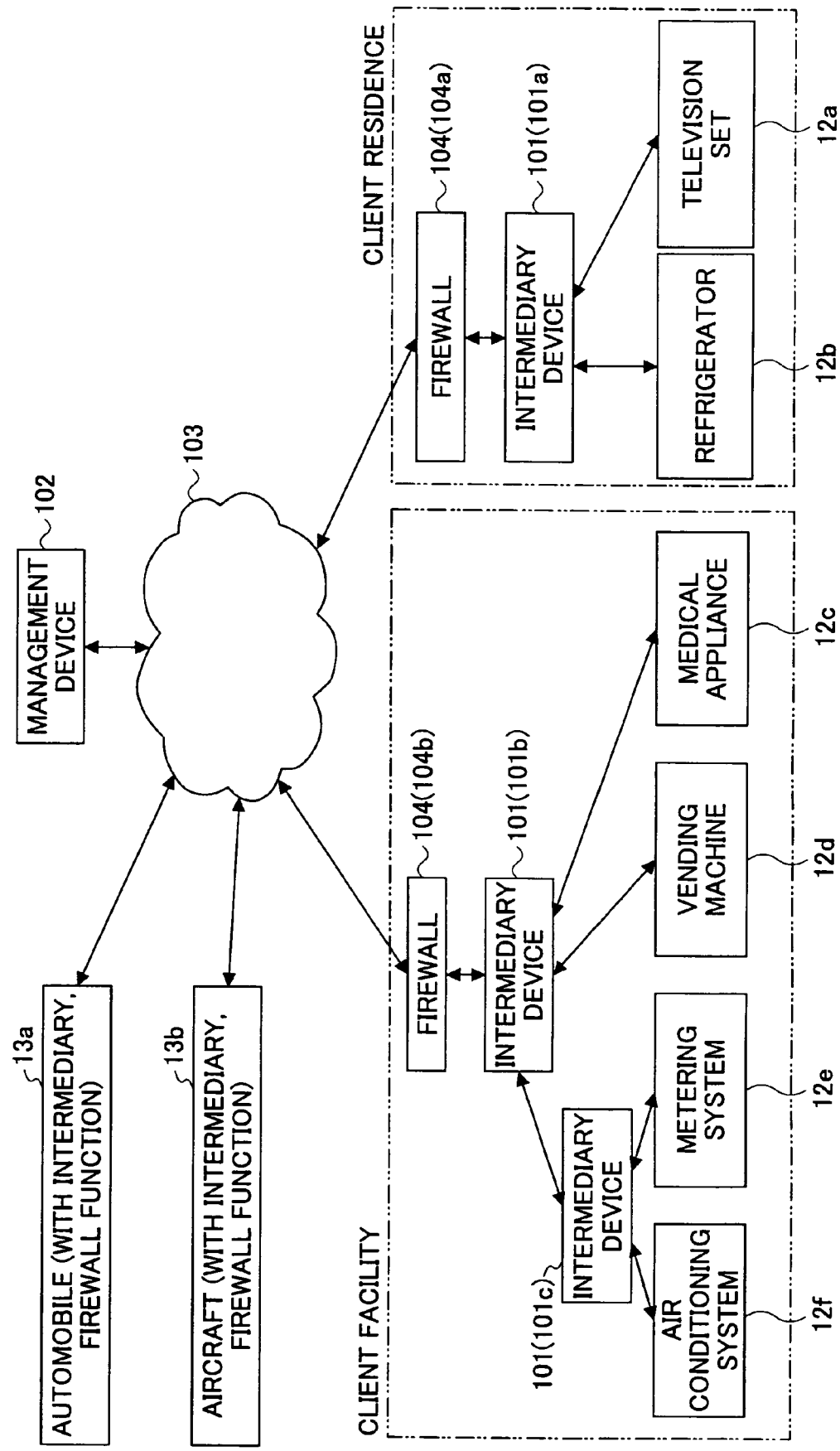
FIG. 25 is a diagram showing an exemplary structure of another remote management system shown in FIG. 1.

For example, as the remote management system shown in FIG. 1, a remote management system 3000 (certification setting system) as shown in FIG. 25 may be obtained. As examples of target management devices provided with separate intermediary devices 101, there is a network household appliance such as a television set 12a, a refrigerator 12b, a medical appliance 12c, a vending machine 12d, a metering system 12e, and an air conditioning system 12f. As examples of the target management device having an intermediary device function, there is an automobile 13a, and an aircraft 13b. It is also preferable to provide a firewall (FW) function to wide area migrating devices such as said automobile 13a and/or said aircraft 13b.

The software for each of the target management devices in the remote management system may be applied with the updating process (method) of the present invention.

Furthermore, the software update device is not limited to the intermediary device shown in FIGS. 1, 3, 25, etc., but may also be, for example, a dedicated software updating device, or the management device 102.

Furthermore, the software update system according to an embodiment of the present invention is not always required to be included in a remote management system. The manner or structure in which the communication device, the target update device, the update device (software update device), the management device, and the target management device are connected, is not to be limited to those described in the above embodiments and examples. Communications between the devices may be performed by with or without wires, and various types of communication lines (communication paths) that are able to build a network may be employed.

Although a communication path using SSL is employed as the first communication path, and a communication path using FTP is employed as the second communication path in the foregoing embodiments, other communication paths (communication methods) using other protocols may alternatively be used as long as the first communication path is able to encode data for transmittal, and the second communication path has a process load less than the first communication path. One way of obtaining a second communication path having a lesser process load than the first communication path is to transmit data without encoding the data. Furthermore, the communication path, which is used by the update device for transmitting update certification information to the target update device for requesting certification, may be a communication path that is different from the second communication path through which update software is transmitted, for example, a communication path using a unique protocol specialized for certification.

The program according to an embodiment of the present invention is a program that allows a computer, which controls the software update device and the communication device (target update device) via a network, to perform various functions of, for example, the certification information setting unit, the certifying unit, and/or the updating unit. By enabling the computer to perform such functions, the advantages of the present invention can be attained.

Although the program may be stored in a memory unit, for example, a ROM or a HDD of a computer beforehand, the program may be provided by storing the program in a recording medium (e.g. CD-ROM, flexible disk), SRAM, EEPROM, a memory card, and/or other non-volatile recording media (memory). The program stored in the memory or recording media may be installed in a computer and executed by a CPU, or may be readout from the memory or recording media by a CPU and executed by the CPU.

Furthermore, the program may also be executed by connecting to a network, and downloading the program from an external device having the program recorded in a recording medium, or an external device having the program stored in a memory unit.

The present invention is not limited to the specifically disclosed embodiments, and variations and modifications may be made without departing from the scope of the present invention.

The present application is based on Japanese Patent Priority Applications Nos. 2003-090827 filed on Mar. 28, 2003, No. 2003-090886 filed on Mar. 28, 2003, No. 2004-58270 filed on Mar. 2, 2004, and No. 2004-58271 filed on May 2, 2004, with the Japanese Patent Office, the entire contents of which are hereby incorporated by reference.

What is claimed is:

1. A software update device configured to communicate with a target update device via a network, the software update device comprising:
a processor configured to provide:
a certification information setting unit configured to generate a first certification information, and transmit the first certification information to the target update device over a connection via a first communication protocol over the network and request that the target update device store the first certification information, and disconnect the connection via the first communication protocol after receiving a notification that the target update device stored the first certification information;
a certification requesting unit configured to transmit the first certification information to the target update device over a connection via a second communication protocol, and request the target update device to execute a certification process with the first certification information;
a transmitting unit configured to transmit an update software that updates a software of the target update device to the target update device via the second communication protocol over the network if the certification process succeeds via the second communication protocol, the second communication protocol having a process load less than that of the first communication protocol; and
a certification information invalidation requesting unit configured to request the target update device to erase the first certification information subsequent to the transmittal of the update software by establishing a second connection via the second communication protocol with the target update device and determining if the target update device successfully obtained the update software, and if the update is successful, establishing a second connection via the first communication protocol with the target update device and transmitting an erasure password to the target update device over the second connection via the first communication protocol and requesting the target update device to erase the first certification information by overwriting the first certification information with the erasure password, and disconnecting the second connection via the first communication protocol after the target update device completes overwriting the first certification information with the erasure password.

2. The software update device as claimed in claim 1, wherein the software of the target update device is updated after being requested by an external unit.

3. The software update device as claimed in claim 2, wherein the processor further provides a notification unit configured to notify a result of updating the software of the target update device to the external unit.

4. The software update device as claimed in claim 1, wherein the first communication protocol is SSL.

5. The software update device as claimed in claim 1, wherein the second communication protocol is FTP.

6. The software update device as claimed in claim 1, wherein data transmitted via the first communication protocol is encoded, wherein data transmitted via the second communication protocol is not encoded.

7. A software update system comprising:
a software update device; and
a target update device in communication with the software update device via a network;

wherein the software update device comprises:
  a processor configured to provide:
    a certification information setting unit configured to generate a first certification information, and transmit the first certification information to a target update device over a connection via a first communication protocol over the network and request that the target update device store the first certification information, and disconnect the connection via the first communication protocol after receiving a notification that the target update device stored the first certification information,
    a certification requesting unit configured to transmit the first certification information to the target update device over a connection via a second communication protocol, and request the target update device to execute a certification process with the first certification information,
    a transmitting unit configured to transmit an update software that updates a software of the target update device to the target update device via the second communication protocol over the network if the certification process succeeds via the second communication protocol, the second communication protocol having a process load less than that of the first communication protocol, and
    a certification information invalidation requesting unit configured to request the target update device to erase the first certification information subsequent to the transmittal of the update software by establishing a second connection via the second communication protocol with the target update device and determining if the target update device successfully obtained the update software, and if the update is successful, establishing a second connection via the first communication protocol with the target update device and transmitting an erasure password to the target update device over the second connection via the first communication protocol and requesting the target update device to erase the first certification information by overwriting the first certification information with the erasure password, and disconnecting the second connection via the first communication protocol after the target update device completes overwriting the first certification information with the erasure password;
wherein the target update device comprises:
  a memory unit configured to store the first certification information, and
  a processor configured to provide:
    a certification unit configured to execute the certification process by using the first certification information after being requested to execute the certification process, and return a result of the certification process to the software update device, and
    an updating unit configured to receive the update software if the certification process succeeds, and update the software of the target update device.

8. The software update system as claimed in claim 7, wherein the processor of the target update device is further configured to provide a certification information invalidating unit configured to invalidate the first certification information after receiving the invalidation request.

9. The software update system as claimed in claim 7, wherein the processor of the target update device further provides:

a restarting unit configured to restart the target update device after the software is updated by the updating unit,
  a start notification transmitting unit configured to transmit a start notification informing that the target update device is started to the software update device after the target update device is started, and
  a version information transmitting unit configured to transmit version information of the target update device in response to a request from the software update device;
wherein the software update device further has a version information unit configured to obtain the version information by requesting the target update device to transmit the version information after the start notification is received after the transmittal of the update software, and confirming the update by comparing with version information of the transmitted update software.

10. The software update system as claimed in claim 7, wherein the first communication protocol is SSL.

11. The software update system as claimed in claim 7, wherein the second communication protocol is FTP.

12. The software update system as claimed in claim 7, wherein data transmitted via the first communication protocol is encoded, wherein data transmitted via the second communication protocol is not encoded.

13. A software update method using a software update device configured to communicate with a target update device via a network, the method comprising the steps of:
  generating a first certification information;
  transmitting the first certification information to the target update device over a connection via a first communication protocol over the network;
  requesting that the target update device store the first certification information;
  disconnecting the connection via the first communication protocol after receiving a notification that the target update device stored the first certification information;
  transmitting the first certification information to the target update device over a connection via a second communication protocol;
  requesting the target update device to execute a certification process with the first certification information;
  transmitting an update software that updates a software of the target update device to the target update device via the second communication protocol over the network if the certification process succeeds via the second communication protocol, the second communication protocol having a process load less than that of the first communication protocol; and
  requesting the target update device to erase the first certification information subsequent to the transmittal of the update software by establishing a second connection via the second communication protocol with the target update device and determining if the target update device successfully obtained the update software, and if the update is successful, establishing a second connection via the first communication protocol with the target update device and transmitting an erasure password to the target update device over the second connection via the first communication protocol and requesting the target update device to erase the first certification information by overwriting the first certification information with the erasure password, and disconnecting the second connection via the first communication protocol after the target update device completes overwriting the first certification information with the erasure password.

14. The software update method as claimed in claim 13, wherein the software of the target update device is updated after being requested by an external unit.

15. The software update device as claimed in claim 14, further comprising a step of notifying a result of updating the software of the target update device to the external unit.

16. The software update method as claimed in claim 13, further comprising the steps of:
   receiving a start notification informing that the target update device is started;
   obtaining version information of the software of the target update device from the target update device after the start notification is received after the transmittal of the update software; and
   confirming the update by comparing with version information of the transmitted update software.

17. The software update method as claimed in claim 13, wherein the first communication protocol is SSL.

18. The software update method as claimed in claim 13, wherein the second communication protocol is FTP.

19. The software update method as claimed in claim 13, wherein data transmitted via the first communication protocol is encoded, wherein data transmitted via the second communication protocol is not encoded.

20. A computer readable storage medium encoded with computer executable instructions, which if executed by a computer, cause the computer to perform a method that controls a software update device configured to communicate with a target update device via a network, the method comprising:
   generating a first certification information;
   transmitting the first certification information to the target update device over a connection via a first communication protocol over the network;
   requesting that the target update device store the first certification information;
   disconnecting the connection via the first communication protocol after receiving a notification that the target update device stored the first certification information;
   transmitting the first certification information to the target update device over a connection via a second communication protocol;
   requesting the target update device to execute a certification process with the first certification information;
   transmitting an update software that updates a software of the target update device to the target update device via the second communication protocol over the network if the certification process succeeds via the second communication protocol, the second communication protocol having a process load less than that of the first communication protocol; and
   requesting the target update device to erase the first certification information subsequent to the transmittal of the update software by establishing a second connection via the second communication protocol with the target update device and determining if the target update device successfully obtained the update software, and if the update is successful, establishing a second connection via the first communication protocol with the target update device and transmitting an erasure password to the target update device over the second connection via the first communication protocol and requesting the target update device to erase the first certification information by overwriting the first certification information with the erasure password, and disconnecting the second connection via the first communication protocol after the target update device completes overwriting the first certification information with the erasure password.

21. The computer readable storage medium as claimed in claim 20, wherein the software of the target update device is updated after being requested by an external unit.

22. The computer readable storage medium as claimed in claim 21, wherein the method further comprises notifying a result of updating the software of the target update device to the external unit.

23. The computer readable storage medium as claimed in claim 20, wherein the method further comprises:
   receiving a start notification informing that the target update device is started;
   obtaining version information of the software of the target update device from the target update device after the start notification is received after the transmittal of the update software; and
   confirming the update by comparing with version information of the transmitted update software.

24. The computer readable storage medium as claimed in claim 20, wherein the first communication protocol is SSL.

25. The computer readable storage medium as claimed in claim 20, wherein the second communication protocol is FTP.

26. The computer readable storage medium as claimed in claim 20, wherein data transmitted via the first communication protocol is encoded, and data transmitted via the second communication protocol is not encoded.

27. A communication device configured to communicate with a software update device via a network, the communication device comprising:
   a processor configured to provide:
      a certification information setting unit configured to generate certification information, and transmit the certification information to the software update device over a connection via a first communication protocol over the network, and receive a first certification information from the software update device over the connection via the first communication protocol over the network, store the first certification information, and notify the software update device that the first certification information is stored so that the software update device will close the connection via the first communication protocol;
      a certifying unit configured to execute a certification process, after receiving the first certification information from the software update device over a connection via a second communication protocol, by comparing the first certification information received over the first communication protocol with the first certification received over the second communication protocol;
      an updating unit configured to receive an update software that updates a software of the communication device from the software update device via the second communication protocol over the network if the certification process succeeds via the second communication protocol, and update the software of the communication device, the second communication protocol having a process load less than that of the first communication protocol; and
      a certification information invalidating unit configured to invalidate the first certification information subsequent to the transmittal of the update software by establishing a second connection via the second communication protocol with the software update device and providing information to the software update device allowing the software update device to determine if the communication device successfully obtained the update software, and if the update is successful, establishing a second connection via the first communication protocol with the software update device and receiving an erasure password from the software update device over the second connection via the first communication protocol and erasing the first certification information by overwriting the first certification information with the erasure password, and disconnecting the second connection via the first communication protocol after completing overwriting the first certification information with the erasure password.

28. The communication device as claimed in claim 27, wherein the processor further provides a control unit configured to instruct an update of the software of the communication device.

29. The communication device as claimed in claim 27, wherein the processor further provides:
a restarting unit configured to restart the communication device after the software is updated;
a start notification transmitting unit configured to transmit a start notification informing that the communication device is started to the software update device after the communication device is started, and
a version information transmitting unit configured to transmit version information of the communication device in response to a request from the software update device after the start after the transmittal of the start notification.

30. The communication device as claimed in claim 27, wherein the first communication protocol is SSL.

31. The communication device as claimed in claim 27, wherein the second communication protocol is FTP.

32. The communication device as claimed in claim 27, wherein data transmitted via the first communication protocol is encoded, wherein data transmitted via the second communication protocol is not encoded.

33. A software update system comprising:
a communication device; and
a software update device in communication with the communication device via a network;
wherein the communication device comprises:
a processor configured to provide:
a certification information setting unit configured to generate certification information, and transmit the certification information to the software update device over a connection via a first communication protocol over the network, and receive a first certification information from the software update device over the connection via the first communication protocol, store the first certification information, and notify the software update device that the first certification information is stored so that the software update device will close the connection via the first communication protocol,
a certifying unit configured to execute a certification process, after receiving the first certification information from the software update device over a connection via a second communication protocol, by comparing the first certification information received over the first communication protocol with the first certification received over the second communication protocol, and
an updating unit configured to receive an update software that updates a software of the communication device from the software update device via the second communication protocol over the network if the certification process succeeds via the second communication protocol, and update the software of the communication device, the second communication protocol having a process load less than that of the first communication protocol;
wherein the software update device comprises:
a memory unit configured to store the first certification information, and
a processor configured to provide:
a certification requesting unit configured to transmit the first certification information to the communication device, and request the communication device to execute the certification process with the first certification information,
a transmitting unit configured to transmit the update software to the communication device via the second communication protocol over the network if the certification process succeeds; and
a certification information invalidation requesting unit configured to request the communication device to erase the first certification information subsequent to the transmittal of the update software by establishing a second connection via the second communication protocol with the communication device and determining if the communication device successfully obtained the update software, and if the update is successful, establishing a second connection via the first communication protocol with the communication device and transmitting an erasure password to the communication device over the second connection via the first communication protocol and requesting the communication device to erase the first certification information by overwriting the first certification information with the erasure password, and disconnecting the second connection via the first communication protocol after the communication device completes overwriting the first certification information with the erasure password.

34. The software update system as claimed in claim 33, wherein the processor of the communication device further provides a certification information invalidating unit configured to invalidate the first certification information.

35. The software update system as claimed in claim 33, wherein the processor of the communication device further provides:
a restarting unit configured to restart the communication device after the software is updated,
a start notification transmitting unit configured to transmit a start notification informing that the communication device is started to the software update device after the communication device is started, and
a version information transmitting unit configured to transmit version information of the communication device in response to a request from the software update device;
wherein the software update device further has a version information unit configured to obtain the version information by requesting the communication device to transmit the version information after the start notification is received after the transmittal of the update software, and confirming the update by comparing with version information of the transmitted update software.

36. The software update system as claimed in claim 33, wherein the first communication protocol is SSL.

37. The software update system as claimed in claim 33, wherein the second communication protocol is FTP.

38. The software update system as claimed in claim 33, wherein data transmitted via the first communication protocol is encoded, wherein data transmitted via the second communication protocol is not encoded.

39. A software update method using a communication device configured to communicate with a software update device via a network, the method comprising the steps of:
generating certification information;
transmitting the certification information to the software update device over a first connection via a first communication protocol over the network;
receiving a first certification information from the software update device over the connection via the first communication protocol;
storing the first certification information;
notifying the software update device that the first certification information is stored so that the software update device will close the connection via the first communication protocol;
executing a certification process, after receiving the first certification information from the software update device over a connection via a second communication protocol, by comparing the first certification information received over the first communication protocol with the first certification information received over the second communication protocol;
receiving an update software that updates a software of the communication device from the software update device via the second communication protocol over the network if the certification process succeeds via the second communication protocol; and
updating the software of the communication device, the second communication protocol having a process load less than that of the first communication protocol; and
invalidating the first certification information subsequent to the transmittal of the update software by establishing a second connection via the second communication protocol with the software update device and providing information to the software update device allowing the software update device to determine if the communication device successfully obtained the update software, and if the update is successful, establishing a second connection via the first communication protocol with the software update device and receiving an erasure password from the software update device over the second connection via the first communication protocol and erasing the first certification information by overwriting the first certification information with the erasure password, and disconnecting the second connection via the first communication protocol after completing overwriting the first certification information with the erasure password.

40. The software update method as claimed in claim 39, further comprising a step of updating the software in response to an instruction to update the software from a control part.

41. The software update method as claimed in claim 39, further comprising the steps of:
restarting the communication device after the software is updated;
transmitting a start notification informing that the communication device is started to the software update device after the communication device is started; and
transmitting version information of the communication device in response to a request from the software update device after the start after the transmittal of the start notification.

42. The software update method as claimed in claim 39, wherein the first communication protocol is SSL.

43. The software update method as claimed in claim 39, wherein the second communication protocol is FTP.

44. The software update method as claimed in claim 39, wherein data transmitted via the first communication protocol is encoded, wherein data transmitted via the second communication protocol is not encoded.

45. A computer readable storage medium encoded with computer executable instructions, which if executed by a computer, cause the computer to perform a method that controls a communication device configured to communicate with a software update device via a network, the method comprising:
generating certification information;
transmitting the certification information to the software update device over a first connection via a first communication protocol over the network;
receiving a first certification information from the software update device over the connection via the first communication protocol;
storing the first certification information;
notifying the software update device that the first certification information is stored so that the software update device will close the connection via the first communication protocol;
executing a certification process, after receiving the first certification information from the software update device over a connection via a second communication protocol, by comparing the first certification information received over the first communication protocol and the first certification information received over the second communication protocol;
receiving an update software that updates a software of the communication device from the software update device via the second communication protocol over the network if the certification process succeeds via the second communication protocol;
updating the software of the communication device, the second communication protocol having a process load less than that of the first communication protocol; and
invalidating the first certification information subsequent to the transmittal of the update software by establishing a second connection via the second communication protocol with the software update device and providing information to the software update device allowing the software update device to determine if the communication device successfully obtained the update software, and if the update is successful, establishing a second connection via the first communication protocol with the software update device and receiving an erasure password from the software update device over the second connection via the first communication protocol and erasing the first certification information by overwriting the first certification information with the erasure password, and disconnecting the second connection via the first communication protocol after completing overwriting the first certification information with the erasure password.

46. The computer readable storage medium as claimed in claim 45, wherein the method further comprises updating the software in response to an instruction to update the software from a control part.

47. The computer readable storage medium as claimed in claim 45, wherein the method further comprises:
restarting the communication device after the software is updated;

transmitting a start notification informing that the communication device is started to the software update device after the communication device is started; and transmitting version information of the communication device in response to a request from the software update device after the start after the transmittal of the start notification.

48. The computer readable storage medium as claimed in claim 45, wherein the first communication is SSL.

49. The computer readable storage medium as claimed in claim 45, wherein the second communication protocol is FTP.

50. The computer readable storage medium as claimed in claim 45, wherein data transmitted via the first communication protocol is encoded, and data transmitted via the second communication protocol is not encoded.

* * * * *